(12) United States Patent
Jacobson et al.

(10) Patent No.: US 10,743,032 B2
(45) Date of Patent: Aug. 11, 2020

(54) SUBSTREAM MULTIPLEXING FOR DISPLAY STREAM COMPRESSION

(71) Applicant: QUALCOMM Incorporated, San Diego, CA (US)

(72) Inventors: Natan Haim Jacobson, San Diego, CA (US); Vijayaraghavan Thirumalai, Fremont, CA (US); Rajan Laxman Joshi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 141 days.

(21) Appl. No.: 15/985,809

(22) Filed: May 22, 2018

(65) Prior Publication Data

US 2018/0343471 A1    Nov. 29, 2018

Related U.S. Application Data

(60) Provisional application No. 62/510,602, filed on May 24, 2017.

(51) Int. Cl.
*H04N 19/70*      (2014.01)
*H04N 19/103*     (2014.01)
(Continued)

(52) U.S. Cl.
CPC .......... *H04N 19/70* (2014.11); *H04N 19/103* (2014.11); *H04N 19/119* (2014.11);
(Continued)

(58) Field of Classification Search
CPC .... H04N 19/70; H04N 19/152; H04N 19/146; H04N 19/103; H04N 19/1883; H04N 19/176; H04N 19/119; H04N 19/46
See application file for complete search history.

(56) References Cited

U.S. PATENT DOCUMENTS

2010/0021142 A1    1/2010  Minami et al.
2014/0192900 A1*   7/2014  Deshpande ............ H04N 19/70
                                                         375/240.26
(Continued)

FOREIGN PATENT DOCUMENTS

WO         2017214515 A1    12/2017

OTHER PUBLICATIONS

ITU-T H.263, Series H: Audiovisual and Multimedia Systems Infrastructure of audiovisual services—Coding of moving video, Video Coding for low bit rate communication, The International Telecommunication Union, Jan. 2005, 226 pp.

(Continued)

*Primary Examiner* — Anner N Holder
*Assistant Examiner* — Jill D Sechser
(74) *Attorney, Agent, or Firm* — Shumaker & Sieffert, P.A.

(57) ABSTRACT

A method and system for encoding video data in a constant bit rate video encoder. A video encoder may determine a coding mode for encoding a block of video data from among one or more coding modes based on a minimum syntax element size and a maximum syntax element size, wherein the minimum syntax element size is greater than 1 bit, encode the block of video data in a plurality of substreams according to the determined coding mode to create a plurality of encoded substreams of video data, store the plurality of encoded substreams of video data in respective balance FIFO buffers, and multiplex the plurality of encoded substreams in a bitstream for transmitting to a decoder.

22 Claims, 21 Drawing Sheets

(51) Int. Cl.

| | | |
|---|---|---|
| *H04N 19/146* | (2014.01) | |
| *H04N 19/152* | (2014.01) | |
| *H04N 19/119* | (2014.01) | |
| *H04N 19/176* | (2014.01) | |
| *H04N 19/169* | (2014.01) | |
| *H04N 19/46* | (2014.01) | |

(52) U.S. Cl.
CPC ......... *H04N 19/146* (2014.11); *H04N 19/152* (2014.11); *H04N 19/176* (2014.11); *H04N 19/1883* (2014.11); *H04N 19/46* (2014.11)

(56) References Cited

U.S. PATENT DOCUMENTS

| | | | |
|---|---|---|---|
| 2015/0296210 A1* | 10/2015 | Thirumalai | ............ H04N 19/19 375/240.18 |
| 2015/0358645 A1 | 12/2015 | Thirumalai et al. | |
| 2016/0044317 A1* | 2/2016 | Thirumalai | .......... H04N 19/152 375/240.26 |
| 2017/0085886 A1 | 3/2017 | Jacobson et al. | |
| 2017/0359583 A1 | 12/2017 | Thirumalai et al. | |

OTHER PUBLICATIONS

ITU-T H.223, Series H: Audiovisual and Multimedia Systems Infrastructure of audiovisual services—Transmission multiplexing and synchronization, Multiplexing protocol for low bit rate multimedia communication, The International Telecommunication Union, Jul. 2001, 74 pp.

ITU-T H.262, Series H: Audiovisual and Multimedia Systems Infrastructure of audiovisual services—Coding of moving video, Information Technology—Generic coding of moving pictures and associated audio information: Video, The International Telecommunication Union, Feb. 2000, 220 pp.

ITU-T H.261, Line Transmission on Non-Telephone Signals, Video Codec for Audiovisual Services at Px64 kbits/s, The International Telegraph and Telephone Consultative Committee, Geneva, 1990, 32 pp.

Richardson, I., "H.264 and MPEG-4 Video Compression: Video Coding for Next-generation Multimedia," John Wiley & Sons, 2003, 65 pp.

Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, JCTVC-L1003_v34, 310 pp.

Walls, F., et al., "VESA Display Stream Compression," Video Electronics Standards Association (VESA), Mar. 3, 2014, 5 pp.

VESA, Video Electronics Standards Association, "VESA Display Stream Compression (DSC) Standard," Version 1.1, Aug. 1, 2014, 125 pp.

International Search Report and Written Opinion—PCT/US2018/034153—ISA/EPO—dated Nov. 2, 2018, 18 pp.

V1 VESA et al., "VESA Display Stream Compression (DSC) Standard Unauthorized Distribution Prohibited VESA Display Stream Compression (DSC) Standard," Jan. 20, 2016, XP055378414, Retrieved from the Internet: https://www.vesa.org/vesa-standards/free-standards/, pp. 1-146.

VESA: "VDC-M Standard VESA Display Compression-M (VDC-M) Standard," May 11, 2018, XP055518459, https://app.box.com/sfvcocw3z73ta09txiskj7cnk6289j356b/folder/49469485945 Retrieved from the Internet: URL:https://vesa.orgjvesa-standards/ [retrieved on Oct. 24, 2018], 173 pp.

Walls F.G., et al., "VESA Display Stream Compression for Television and Cinema Applications," IEEE Journal on Emerging and Selected Topics in Circuits and Systems, IEEE, Piscataway, NJ, USA, Dec. 1, 2016 (Dec. 1, 2016), vol. 6(4), pp. 460-470, XP011636928.

* cited by examiner

Table 1: balanceFifoSize for various minSeSize, maxSeSize

| minSeSize | maxSeSize | muxWordSize | requiredBits | ssmDelay | balanceFifoSize |
|---|---|---|---|---|---|
| 1 | 142 | 144 | 285 | 285 | 40,470 |
| 2 | 142 | 144 | 285 | 143 | 20,306 |
| 1 | 126 | 128 | 253 | 253 | 31,878 |
| 2 | 126 | 128 | 253 | 127 | 16,002 |
| 1 | 110 | 112 | 221 | 221 | 24,310 |
| 2 | 110 | 112 | 221 | 111 | 12,210 |
| 1 | 94 | 96 | 189 | 189 | 17,766 |
| 2 | 94 | 96 | 189 | 95 | 8,930 |

FIG. 9

| | minSeSize | maxSeSize | muxWordSize | requiredBits | ssmDelay | balanceFifoSize |
|---|---|---|---|---|---|---|
| A | 2 | 142 | 144 | 285 | 143 | 20,306 |
| B | 2 | 126 | 128 | 253 | 127 | 16,002 |
| C | 2 | 126 | 128 | 253 | 143 | 18,018 |

FIG. 12

SUBSTREAM MULTIPLEXING FOR DISPLAY STREAM COMPRESSION

This application claims the benefit of U.S. Provisional Application No. 62/510,602, filed May 24, 2017, the entire content of which is incorporated by reference herein.

TECHNICAL FIELD

This disclosure relates to the field of video coding and compression, and particularly, to video compression for transmission over display links, such as display stream compression.

BACKGROUND

Digital content capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Links, such as display links, may be used to transfer content from a source (e.g., a memory storing image and/or video data) to a display. For example, a display link may connect a set-top box to a television or a computer to a display.

The bandwidth requirements of display links are typically proportional to the resolutions of the displays, and thus, high-resolution displays benefit from large bandwidth display links. Some display links do not have the bandwidth to support high resolution displays. Video compression can be used to reduce the bandwidth requirements such that lower bandwidth display links can be used to provide digital video to higher resolution displays. Image compression on the pixel data may be used. However, such schemes are sometimes not visually lossless or can be difficult and expensive to implement in conventional display devices.

The Video Electronics Standards Association (VESA) has developed Display Stream Compression (DSC) as a standard for display link video compression. A display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

In general, this disclosure describes techniques for encoding video data. In some examples, this disclosure describes encoding techniques that may reduce the size of a balance first-in, first-out (FIFO) buffer used in the encoder substream multiplexer of a constant bitrate video codec (e.g., a VDC-M codec). Reducing the size of the balance FIFO may result in a reduction of required memory in a hardware implementation of a video codec.

In one example, this disclosure describes an apparatus configured to encode video data, the apparatus comprising a memory configured to store a block of video data, and one or more processors in communication with the memory, the one or more processors configured to determine a coding mode for encoding the block of video data from among one or more coding modes based on a minimum syntax element size and a maximum syntax element size, wherein the minimum syntax element size is greater than 1 bit, encode the block of video data in a plurality of substreams according to the determined coding mode to create a plurality of encoded substreams of video data, store the plurality of encoded substreams of video data in respective balance FIFO buffers, and multiplex the plurality of encoded substreams in a bitstream for transmitting to a decoder.

In another example, this disclosure describes a method of encoding video data, the method comprising determining a coding mode for encoding a block of video data from among one or more coding modes based on a minimum syntax element size and a maximum syntax element size, wherein the minimum syntax element size is greater than 1 bit, encoding the block of video data in a plurality of substreams according to the determined coding mode to create a plurality of encoded substreams of video data, storing the plurality of encoded substreams of video data in respective balance FIFO buffers, and multiplexing the plurality of encoded substreams in a bitstream for transmitting to a decoder.

In another example, this disclosure describes a non-transitory computer-readable storage medium storing instructions that, when executed, causes one or more processors configured to encode video data to determine a coding mode for encoding a block of video data from among one or more coding modes based on a minimum syntax element size and a maximum syntax element size, wherein the minimum syntax element size is greater than 1 bit, encode the block of video data in a plurality of substreams according to the determined coding mode to create a plurality of encoded substreams of video data, store the plurality of encoded substreams of video data in respective balance FIFO buffers, and multiplex the plurality of encoded substreams in a bitstream for transmitting to a decoder.

In another example, this disclosure describes an apparatus configured to encode video data, the apparatus comprising means for determining a coding mode for encoding a block of video data from among one or more coding modes based on a minimum syntax element size and a maximum syntax element size, wherein the minimum syntax element size is greater than 1 bit, means for encoding the block of video data in a plurality of substreams according to the determined coding mode to create a plurality of encoded substreams of video data, means for storing the plurality of encoded substreams of video data in respective balance FIFO buffers, and means for multiplexing the plurality of encoded substreams in a bitstream for transmitting to a decoder.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 9 is a table showing balance FIFO sizes for various minimum and maximum syntax element sizes.

FIG. 12 is a table showing example balance FIFO sizes for different substreams.

DETAILED DESCRIPTION

Figure 1A:
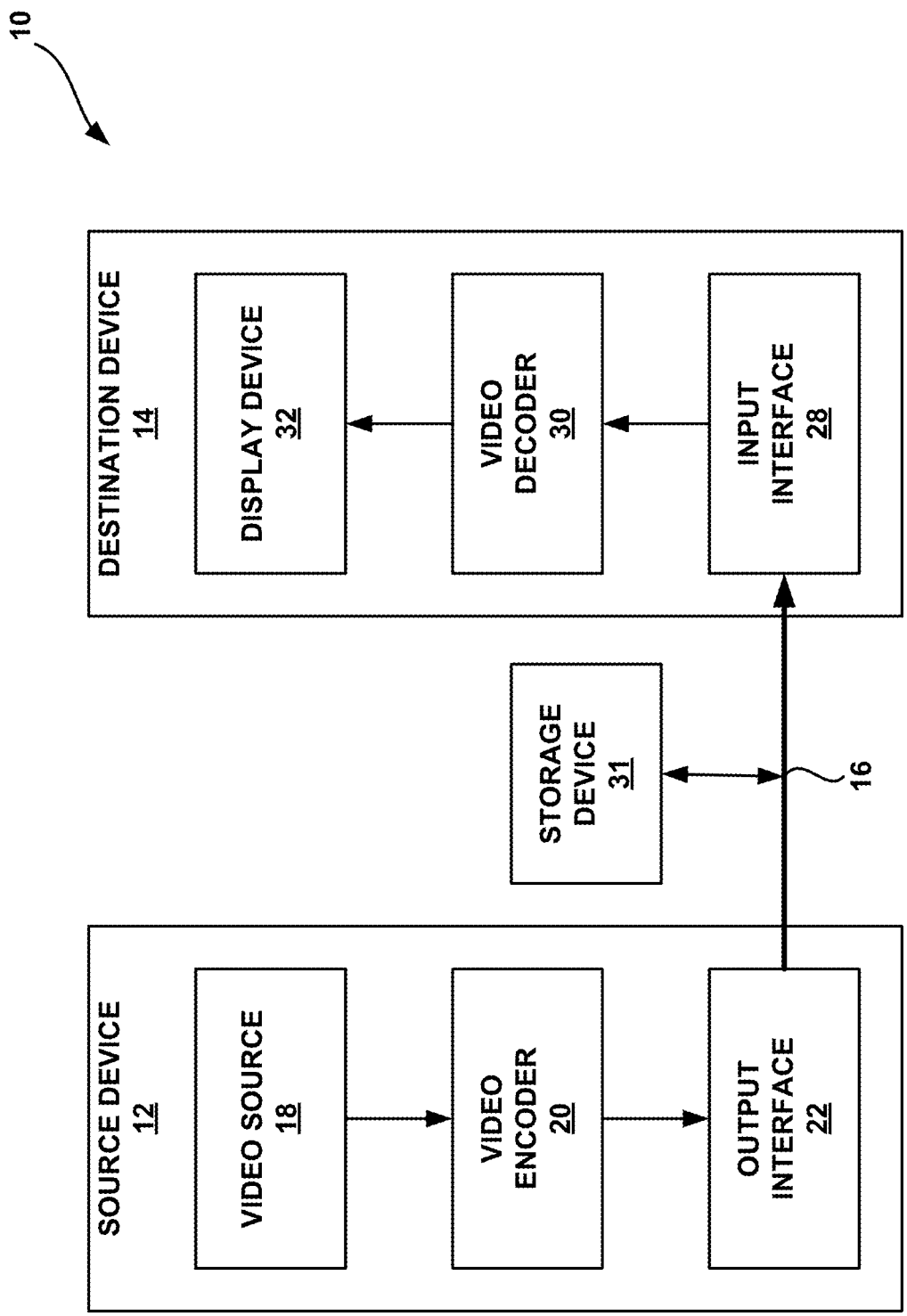
FIG. 1A is a block diagram illustrating an example video coding system that may be configured to perform the techniques of this disclosure.

In general, this disclosure describes techniques for encoding content, including the encoding and decoding of video data. The techniques of this disclosure may be used with any video compression techniques, whether or not in accordance with content coding standards such as DSC, VESA Display Compression-M (VDC-M) or other content coding standards. For example, this disclosure describes techniques for the coding of image content (e.g., video data) for transmission, such as transmission over a link (e.g., a display link). As another example, this disclosure describes techniques that may be used to increase the compression ratio (e.g., from 3:1 to 4:1 as one example) of content in accordance with a fixed rate visually lossless content coding standard, such as DSC or VDC-M.

A digital image, such as a video image, a TV image, a still image or an image generated by a video recorder or a computer, may include pixels or samples arranged in horizontal and vertical lines. The number of pixels in a single image is typically in the hundreds of thousands to millions for 4 k resolution. Each pixel may be represented by luminance and chrominance information (e.g., YCrCb) and/or other color formats (e.g., RGB). Without compression, the sheer quantity of information to be conveyed from an image encoder to an image decoder would render real-time image transmission impractical. To reduce the amount of information to be transmitted, a number of different compression methods, such as JPEG, MPEG and H.263, H.264, and H.265 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and H.265 (also known as HEVC) including extensions of such standards.

In addition, video coding standards have been developed by Video Electronics Standards Association (VESA), namely DSC and VDC-M. The DSC and VDC-M standards allow for compression of video data for transmission over display links. As the resolution of displays increases, the bandwidth of the video data required to drive the displays increases correspondingly. Some display links may not have the bandwidth to transmit all of the video data to the display for such resolutions. Accordingly, the DSC and VDC-M standards specify compression standards for interoperable, visually lossless compression over display links.

The DSC and VDC-M standards differ from other video coding standards, such as H.264 and HEVC. DSC and VDC-M include intra-frame compression, but do not include inter-frame compression, meaning that temporal information may not be used in coding the video data. In contrast, other video coding standards may employ inter-frame compression in their video coding techniques.

In general, the present disclosure relates to techniques of improving video compression techniques. More specifically, this disclosure relates to systems and methods for substream multiplexing that facilitates higher throughput by allowing decoders to decode two or more substreams in parallel. In some examples, this disclosure describes techniques that may reduce the size of a balance first-in, first-out (FIFO) buffer used in an encoder Substream Multiplexer of a display stream compression codec (e.g., VDC-M). Reducing the size of the balance FIFO results in a reduction of required RAM in a hardware implementation of VDC-M codecs or other codecs that may use substream multiplexing.

While certain examples are described herein in the context of the DSC and/or VDC-M standards, one having ordinary skill in the art would appreciate that systems, devices, and methods disclosed herein may be applicable to any suitable video coding standard. For example, example techniques disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. The techniques described herein may be particularly applicable to standards which incorporate a constant bit rate (CBR) buffer model. Also, the techniques described in this disclosure may become part of standards developed in the future. In other words, the techniques described in this disclosure may be applicable to previously developed video coding standards, video coding standards currently under development, and forthcoming video coding standards.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
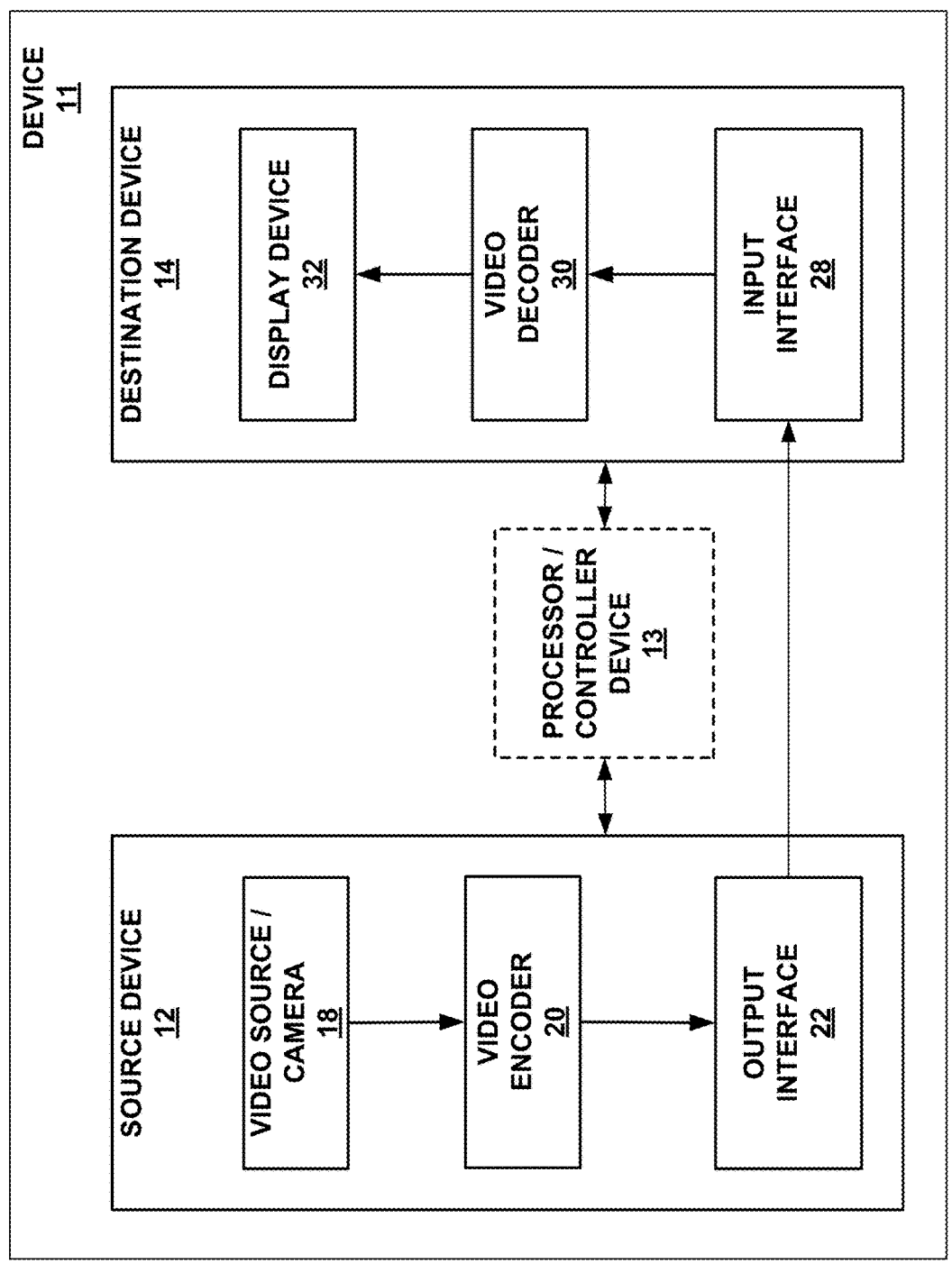
FIG. 1B is a block diagram illustrating another example video coding system that may be configured to perform the techniques of this disclosure.

As shown in FIG. 1A, video coding system 10 includes source device 12 that generates encoded video data to be decoded at a later time by destination device 14. In the example of FIG. 1A, source device 12 and destination device 14 constitute separate devices. It is noted, however, that source device 12 and destination device 14 may be on or part of the same device, as shown in the example of FIG. 1B.

Source device 12 and destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removably attachable) by (to) an entity (e.g., a human, an animal, and/or another controlled device) such as eyewear and/or a wearable computer. In various embodiments, source device 12 and destination device 14 may be equipped for wireless communication.

Destination device 14 may receive, via link 16, the encoded video data to be decoded. Link 16 may comprise any type of medium or device capable of moving the encoded video data from source device 12 to destination device 14. In the example of FIG. 1A, link 16 may comprise a communication medium to enable the source device 12 to transmit encoded video data to the destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, source device 12 includes video source 18, video encoder 20 and output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by video encoder 20 in accordance with the techniques of this disclosure that will be described in more detail below. The encoded video data may be transmitted to destination device 14 via output interface 22 of source device 12. The encoded video data may also (or alternatively) be stored onto a storage device 31 for later access by the destination device 14 or other devices, for decoding and/or playback. In FIG. 1A, storage device 31 is depicted as being separate from source device 12. In other examples, storage device 31 may be part of source device 12. Video encoder 20 illustrated in FIGS. 1A and 1B may comprise video encoder 20 illustrated in FIG. 2A or any other video encoder described herein.

In the example of FIG. 1A, destination device 14 includes input interface 28, video decoder 30, and display device 32. In some cases, input interface 28 may include a receiver and/or a modem. Input interface 28 of destination device 14 may receive the encoded video data over link 16 and/or from storage device 31. The encoded video data communicated over link 16, or provided on storage device 31, may include a variety of syntax elements generated by video encoder 20 for use by a video decoder, such as the video decoder 30, in decoding the video data. Such syntax elements may be included with the encoded video data transmitted on a communication medium, stored on a storage medium, or stored a file server. Video decoder 30 illustrated in FIGS. 1A and 1B may comprise video decoder 30 illustrated in FIG. 2B or any other video decoder described herein.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein source device 12 and destination device 14 are on or part of device 11. Device 11 may be a telephone handset, such as a "smart" phone or the like. Device 11 may include a processor/controller device 13 (optionally present) in operative communication with source device 12 and destination device 14. Video coding system 10' of FIG. 1B, and components thereof, are otherwise similar to the video coding system 10 of FIG. 1A, and components thereof.

Video encoder 20 and video decoder 30 may operate according to a video compression standard, such as, for example, DSC and/or VDC-M. Alternatively, video encoder 20 and video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard, and may be applied to any video compression techniques that use a constant bit rate buffer model. Other examples of video compression standards include MPEG-2 and ITU-T H.263.

Although not shown in the examples of FIGS. 1A-1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

Each of video encoder 20 the video decoder 30 may be included in one or more encoders or decoders, either of which may be integrated as part of a combined encoder/decoder in a respective device.

Examples of the current generation of 3:1 DSC v1.0 solution recently finalized by the VESA may be insufficient to drive future market requirements (e.g., mobile market requirements), especially for high resolution displays such as 4K. Therefore, to cope with future demands, VESA released a CfT (call for technology) in order to develop a next generation DSC solution that targets compression ratios of 4:1 and higher.

Video encoder 20 and video decoder 30 of FIGS. 1A and 1B are examples of the DSC and/or VDC-M coder of this disclosure. In some examples, video encoder 20 and video decoder may operate according to a test model or software model, which may refer to compression protocol, algorithm, standard, or the like that content coder may be configured to code data in accordance therewith. In some examples, one or more techniques and/or benefits described herein relate to a VDC-M test model.

Video encoder 20 and video decoder 30 may be configured to code video data with a block-based approach (with block size P×Q) and may be configured to code the video data with one or more of a plurality of coding modes. That is, video encoder 20 and video decoder 30 may be configured to code a frame of video data divided into blocks of samples. In some examples, available coding modes for each block may include transform mode (e.g., discrete cosine transform (DCT), Hadamard transform, etc.), block prediction (BP) mode, BP skip mode, differential pulse code modulation (DPCM) mode, pattern mode, mid-point prediction (MPP) mode, and/or mid-point predication fall back (MPPF) mode. Video encoder 20 may be configured to determine a coding mode to use and may signal a syntax element to video decoder 30 indicating the coding mode to use. In the context of this disclosure, a syntax element size may refer to the number of bits used to encode and decode a single substream's worth of data for a single block. In one example, a syntax element may refer to a single component worth of data in a single block, as each component may belong to a separate substream.

Several coding modes may be used in the coder (e.g., video encoder 20 and/or video decoder 30) in order to effectively compress different types of contents or images. In some examples, video encoder 20 and video decoder 30 may use multiple different coding modes for coding blocks of one frame of video data. For example, text images can be effectively compressed by pattern mode, while natural images may be more effectively captured by transform mode.

In some examples, video encoder 20 may be configured to select a coding mode for each block from the plurality of coding modes based on a rate-control mechanism. For example, video encoder 20 may be configured to determine a coding mode for each block by considering both the bitrate achieved by using the coding and the resultant distortion of a block coded with that coding mode. In some examples, the rate-control mechanism is supported by a buffer model. In one example, it may be a design requirement of the codec (e.g., video encoder 20 and video decoder 30) that an output buffer of video encoder 20 is never in a state of underflow (e.g., fewer than zero bits in the buffer) or overflow (e.g., more data has been encoded than a predetermined maximum size before transmission). Accordingly, video encoder 20 may determine that certain coding modes are unavailable because they cause the output buffer to be in a state of underflow or overflow.

When coding a bock, if all the values of a color component in a given block are zero, then video encoder 20 may effectively encode the color component using skip mode. In skip mode coding, video encoder 20 may signal a 1-bit flag to video decoder 30 to indicate whether the current block is coded using skip mode (e.g., if all values are zero) or not in skip mode (e.g., if at least one value in a block is non-zero). In skip mode, when all of the values of a color component of the current block are zero, video encoder 20 may signal the 1-bit flag to video decoder 30 and video encoder 20 may refrain from coding the values of the color component of the block (i.e., the coding of the values of the color component of the block may be skipped). Skip mode may also be applied to a group of values of a color component having a size that is smaller than a block, or to a group of multiple blocks. Skip mode may also be applied separately for each color component of a block, for example, when all of the values of a color component of the current block are zero, skip mode may be applied to the values of the color component of the current block. In some implementations, skip mode may be applied to all of the color components of a group or block.

As generally described above, video encoder 20 is configured to encode video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data, including one or more syntax elements. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include a set of coding parameters such as a quantization parameter (QP). To generate a coded picture, video encoder 20 may partition a picture into equally-sized video blocks. A video block may be a two-dimensional array of samples. Samples may be data that indicates the color of a pixel. In some examples, colors of pixels may be represented by a luma component (e.g., Y) and one or more chroma components (e.g., red and blue chroma (Cr and Cb), or orange and green chroma (Co and Cg)). In other examples, video encoder 20 may be configured to code video data having pixels in an RGB (Red, Green, Blue) color format. The coding parameters may define a coding mode for the blocks of the video data. The coding mode may be specified for each block of video data individually or for groups of blocks. The coding mode may be determined in order to achieve a desired rate-distortion performance.

In some examples, video encoder 20 may partition a picture into a plurality of slices. Each of the slices may include a spatially distinct region in an image (e.g., a frame) that can be encoded or decoded independently without information from the rest of the regions in the image or frame. Each image or video frame may be encoded in a single slice or each image or video frame may be encoded in several slices. In examples of DSC and/or VDC-M, the target bits allocated to encode each slice may be substantially constant. As part of performing an encoding operation on a picture, the video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

Figure 2A:
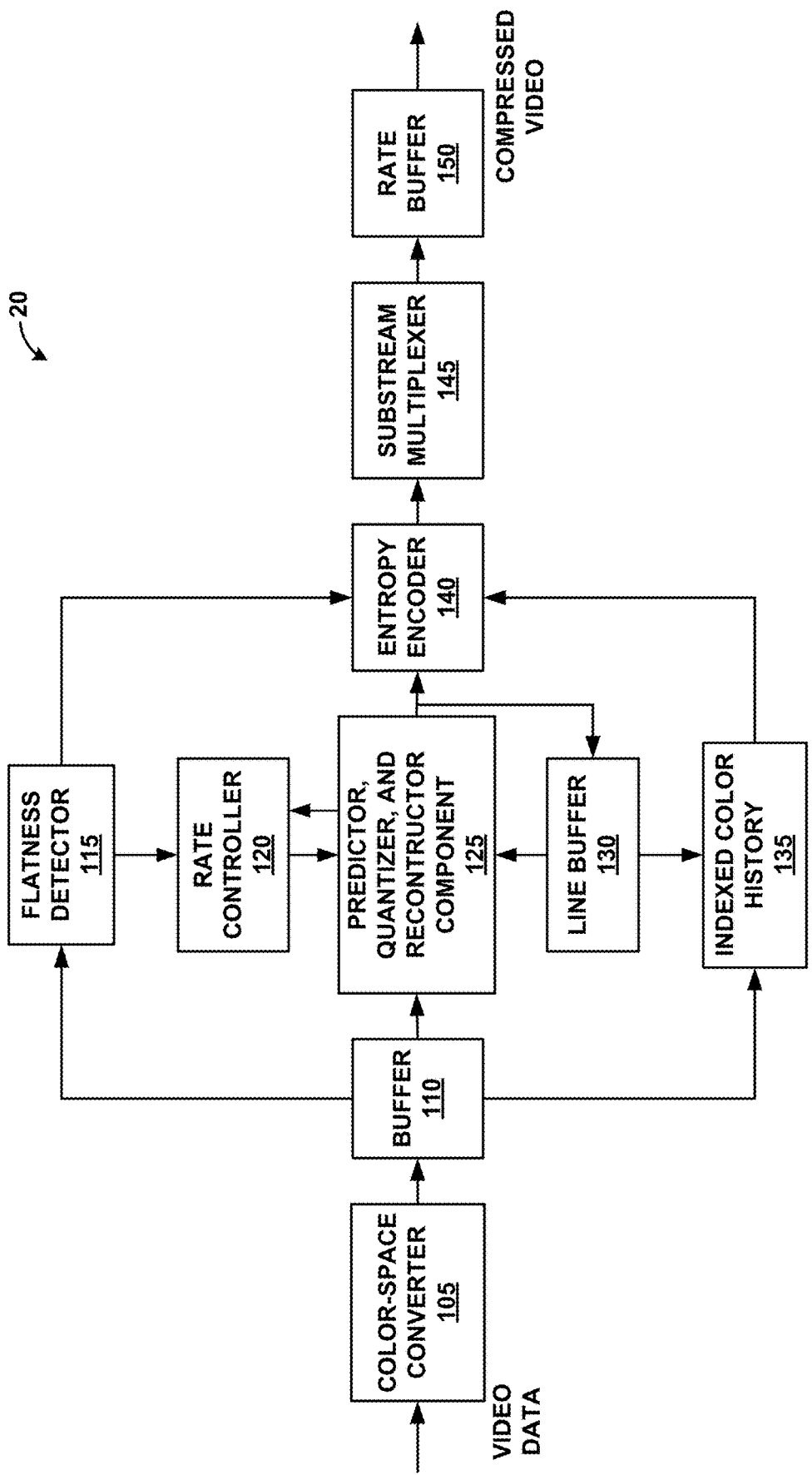
FIG. 2A is block diagram illustrating an example video encoder that may be configured to perform the techniques of this disclosure.

FIG. 2A is a block diagram illustrating an example of the video encoder 20 that may implement techniques in accordance with aspects described in this disclosure. Video encoder 20 may be configured to perform some or all of the techniques of this disclosure. In some examples, the techniques described in this disclosure may be performed by various components of video encoder 20. In some examples, additionally or alternatively, a processor (not shown) may be configured to perform some or all of the techniques described in this disclosure. For purposes of explanation, this disclosure describes video encoder 20 in the context of DSC and/or VDC-M coding. However, the techniques of this disclosure may be applicable to other coding standards or methods, including other video coding techniques that use a CBR buffer model.

In the example of FIG. 2A, video encoder 20 includes a plurality of components. The components of video encoder 20 include color-space converter 105, buffer 110, flatness detector 115, rate controller 120, predictor, quantizer, and reconstructor component 125, line buffer 130, indexed color history 135, entropy encoder 140, substream multiplexer 145, and rate buffer 150. In other examples, video encoder 20 may include more, fewer, or different components.

Color-space converter 105 may be configured to receive video data and convert an input color-space of the video data to the color-space used in the coding implementation. For example, in one exemplary embodiment, the color-space of the input video data may be in the RGB color-space, while the coding process performed by video encoder 20 is implemented in the luminance Y, chrominance green Cg, and chrominance orange Co (YCoCg) color-space. Color-space converter 105 may be configured to perform the color-space conversion using any technique, including shifts and additions to the video data. It is noted that input video data in other color-spaces may be processed and conversions to other color-spaces may also be performed. If conversion to a different color space is not needed, color-space converter 105 may be bypassed.

Video encoder 20 may also include buffer 110, line buffer 130, and/or rate buffer 150. Buffer 110, line buffer 130, and/or rate buffer 150 may comprise memory or data storage media, such as random access memory (RAM), synchronous dynamic random access memory (SDRAM), read-only memory (ROM), non-volatile random access memory (NVRAM), electrically erasable programmable read-only memory (EEPROM), FLASH memory, cache memory, magnetic or optical data storage media, and the like.

Buffer 110 may be configured to store the color-space converted video data prior to its use by other components of video encoder 20. In another example, buffer 110 may store video data in the RGB color-space and color-space conversion may be performed as needed, since the color-space converted data may require more bits.

Rate buffer 150 may be used as part of the rate control mechanism in video encoder 20, which will be described in greater detail below in connection with rate controller 120. The bits spent on encoding each block can vary highly substantially based on the nature of the particular block. Rate buffer 150 can smooth the rate variations in the compressed video. In some examples, video encoder 20 may use a CBR buffer model in which bits are taken out from rate buffer 150 at a constant bit rate. In the CBR buffer model, if video encoder 20 adds too many bits to the bitstream, rate buffer 150 may overflow. On the other hand, video encoder 20 may be configured to add enough bits in order to prevent underflow of rate buffer 150. In some examples, when the rate buffer fullness approaches its maximum size, video encoder 20 may be configured to increase the QP in order to prevent overflow. When the rate buffer fullness approaches empty, video encoder 20 may be configured to stuff zero bits into rate buffer 150 to prevent underflow. Rate buffer 150 may be configured to output the compressed video data to a video decoder (e.g., video decoder 30).

On video decoder side, bits may be added to rate buffer 155 of video decoder 30 (see FIG. 2B which is described in further detail below) at a constant bit rate, and video decoder 30 may remove variable numbers of bits for each block. To ensure proper decoding, rate buffer 155 of video decoder 30 is preferably configured to not "underflow" or "overflow" during the decoding of the compressed bit stream.

In some examples, the buffer fullness (BF) can be defined based on the values of the syntax element BufferCurrentSize. The value of BufferCurrentSize represents the number of bits currently in the buffer (e.g., rate buffer 150). The value of variable BufferMaxSize represents the size of rate buffer 150, i.e., the maximum number of bits that can be stored in rate buffer 150 at any point in time. The BF may be calculated as:

$$BF=((BufferCurrentSize*100)/BufferMaxSize)$$

It is noted that the above approach to calculating BF is merely exemplary, and that the BF may be calculated in any number of different ways, depending on the particular implementation or context.

Flatness detector 115 is configured to detect changes from complex (e.g., non-uniform) areas in the video data to flat (e.g., simple or uniform) areas in the video data, and/or vice versa. The terms "complex" and "flat" will be used herein to generally refer to the difficulty for video encoder 20 to encode the respective regions of the video data. Thus, the term "complex," as used herein, generally describes a region of the video data as being more complex for the video encoder 20 to encode (e.g., requiring more bits and/or more processing time) and may, for example, include textured video data, video data with high spatial frequency, and/or other features which are complex to encode. The term "flat," as used herein generally describes a region of the video data as being less complex for video encoder 20 to encode (e.g., requiring fewer bit and/or less processing time) and may, for example, include a smooth gradient in the video data, video data with low spatial frequency, and/or other features which are simple to encode. The transitions from complex to flat regions may be used by video encoder 20 to reduce quantization artifacts in the encoded video data. Specifically, rate controller 120 and predictor, quantizer, and reconstructor component 125 can reduce such quantization artifacts when the transitions from complex to flat regions are identified. Similarly, transitions from flat to complex regions may be used by video encoder 20 to increase the QP in order to reduce the expected rate required to code a current block.

Rate controller 120 determines a set of coding parameters, including a QP. Quantization introduces loss in a signal and the amount of loss can be controlled by the QP. Instead of storing the quantization step size for each QP, a scaling matrix may be specified as a function of the QP. In some examples, the quantization step size for each QP can be derived from the scaling matrix. The derived value for the quantization step is not necessarily a power of two, e.g., the derived quantization step size can also be non-power of two. Rater controller 120 may adjust the QP based on the buffer fullness of rate buffer 150 and image activity of the video data (e.g., a transition from complex to flat regions or vice versa) in order to maximize picture quality for a target bit rate, which ensures that rate buffer 150 does not overflow or underflow. Rate controller 120 may also be configured to determine a particular coding option (e.g., a particular coding mode) for each block of the video data in order to achieve a desired rate-distortion performance. Rate controller 120 minimizes the distortion of the reconstructed images such that it satisfies the bit-rate constraint, e.g., the overall actual coding rate fits within the target bit rate. Thus, one purpose of rate controller 120 is to determine a set of coding parameters, such as QP(s), coding mode(s), etc., to satisfy instantaneous and average constraints on rate while maximizing rate-distortion performance.

Predictor, quantizer, and reconstructor component 125 may perform various encoding operations of video encoder 20. For example, predictor, quantizer, and reconstructor component 125 may perform a prediction coding process (e.g., prediction mode) in a number of different coding modes. One example predication mode is a modified version of median-adaptive prediction. Median-adaptive prediction may be implemented by the lossless JPEG standard (JPEG-LS). The modified version of median-adaptive prediction, which may be performed by predictor, quantizer, and reconstructor component 125, may allow for parallel prediction of three consecutive sample values. Another example prediction mode is block prediction. In block prediction, samples of a currently encoded block are predicted from previously reconstructed pixels in the line above or to the left in the same line as the currently encoded sample. In some examples, video encoder 20 and video decoder 30 may both perform an identical search on reconstructed pixels to determine the block prediction usages, and thus, no bits need to be sent in the block prediction mode. In other examples, video encoder 20 may perform a search and signal block prediction vectors in the bitstream, such that video decoder 30 need not perform a separate search. The block prediction vectors indicate the location of the samples of previously encoded blocks that are used to perform the prediction. The block prediction vectors may be represented as an offset in both the x-direction and y-direction relative to the currently coded block and/or sample. Predictor, quantizer, and reconstructor component 125 may also be configured to perform a midpoint prediction mode in which samples are predicted using the midpoint of the component range. The midpoint prediction mode may enable bounding of the number of bits required for the compressed video in even the worst-case sample.

In some example prediction modes, predictor, quantizer, and reconstructor component 125 may generate a prediction residual. A prediction residual may be the difference between sample values of a predictive block of video data and sample values of the block of video data being coded. As will be discussed below, the prediction residuals may be quantized and may be further compressed, e.g., using entropy encoding techniques.

Predictor, quantizer, and reconstructor component 125 may be further configured to perform quantization. For example, predictor, quantizer, and reconstructor component 125 may perform quantization via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by rate controller 120. Predictor, quantizer, and reconstructor component 125 also performs reconstruction, which includes adding the inverse quantized residual to the predicted value and ensuring that the result does not fall outside of the valid range of sample values. Predictor, quantizer, and reconstructor component 125 may perform quantization operations based on the QP determined by rate controller 120.

It is noted that the above-described example approaches to prediction, quantization, and reconstruction performed by predictor, quantizer, and reconstructor component 125 are merely illustrative and that other approaches may be implemented. It is also noted that predictor, quantizer, and reconstructor component 125 may include subcomponent(s) for performing the prediction, the quantization, and/or the reconstruction. It is further noted that prediction, the quantization, and/or the reconstruction may be performed by several separate encoder components in lieu of predictor, quantizer, and reconstructor component 125.

Line buffer 130 is configured to store the output from predictor, quantizer, and reconstructor component 125 so that predictor, quantizer, and reconstructor component 125 and indexed color history 135 can use and/or store the buffered video data. Indexed color history 135 is a memory configured to store recently used pixel values. These recently used pixel values can be referenced directly by video encoder 20 via a dedicated syntax.

Entropy encoder 140 encodes the prediction residuals and any other data (e.g., syntax elements and indices identified by the predictor, quantizer, and reconstructor component 125) received from predictor, quantizer, and reconstructor component 125 based on indexed color history 135 and the flatness transitions identified by flatness detector 115. In some examples, entropy encoder 140 may encode three samples per clock per substream encoder. Substream multiplexer 145 may multiplex the bitstream based on a headerless packet multiplexing scheme. This allows video decoder 30 to run three entropy decoders in parallel, facilitating the decoding of three pixels per clock. Substream multiplexer 145 may optimize the packet order so that the packets can be efficiently decoded by video decoder 30. It is noted that different approaches to entropy coding may be implemented, which may facilitate the decoding of power-of-2 pixels per clock (e.g., 2 pixels/clock or 4 pixels/clock).

Figure 2B:
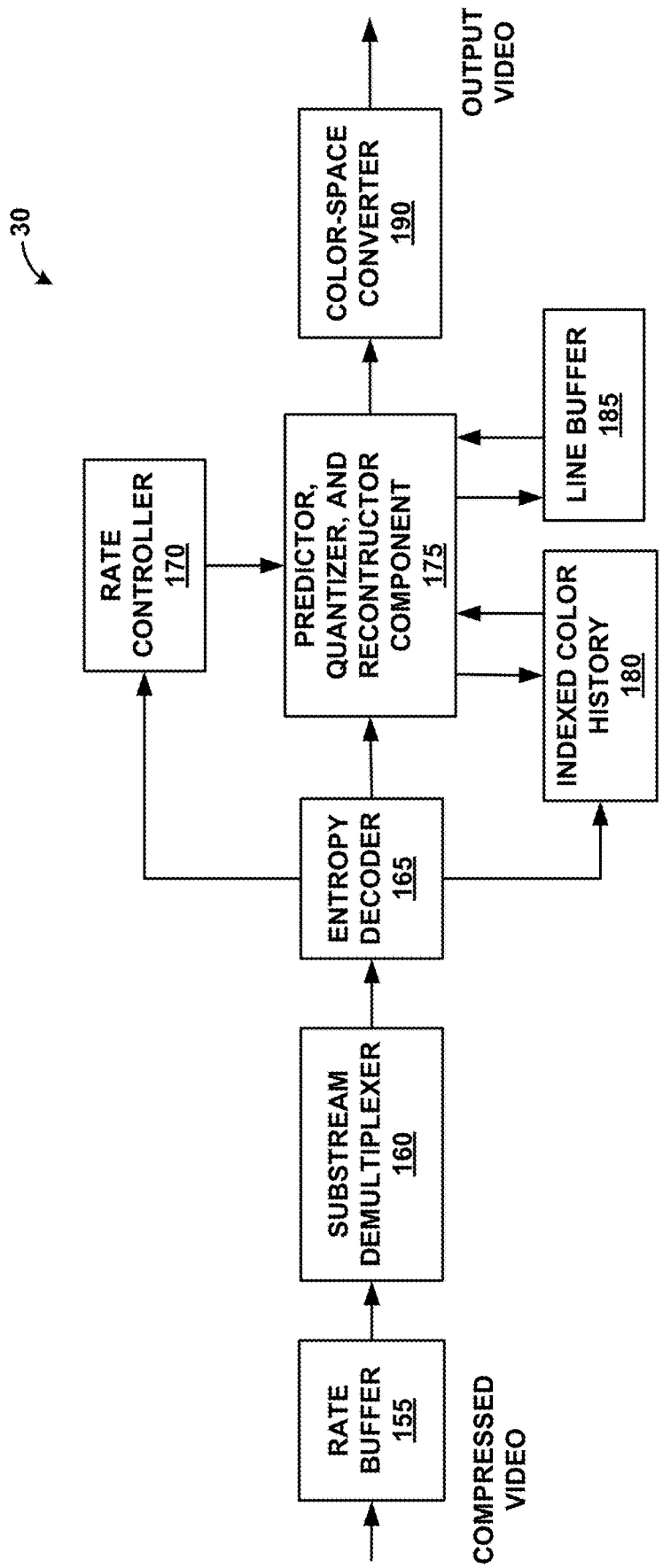
FIG. 2B is block diagram illustrating an example video decoder that may be configured to perform the techniques of this disclosure.

FIG. 2B is a block diagram illustrating an example video decoder 30 that may implement techniques in accordance with aspects described in this disclosure. Video decoder 30 may be configured to perform some or all of the techniques of this disclosure. In some examples, the techniques described in this disclosure may be shared among the various components of the decoder 30. In some examples, additionally or alternatively, a processor (not shown) may be configured to perform some or all of the techniques described in this disclosure.

For purposes of explanation, this disclosure describes video decoder 30 in the context of DSC and/or VDC-M coding. However, the techniques of this disclosure may be applicable to other coding standards or methods.

In the example of FIG. 2B, the video decoder 30 includes a plurality of functional components. The functional components of video decoder 30 include rate buffer 155, substream demultiplexer 160, entropy decoder 165, rate controller 170, predictor, quantizer, and reconstructor component 175, indexed color history 180, line buffer 185, and color-space converter 190. The illustrated components of video decoder 30 are analogous to the corresponding components described above in connection with video encoder 20 in FIG. 2A. As such, each of the components of video decoder 30 may operate in a similar, but reciprocal fashion to the corresponding components of the video encoder 20 as described above.

Line buffer 185, and/or rate buffer 155 may comprise memory or data storage media, such as RAM, SDRAM, ROM, NVRAM, EEPROM, FLASH memory, cache memory, magnetic or optical data storage media, and the like. Rate buffer 155 may be configured to receive compressed video (e.g., from video encoder 20), and is used as part of the rate control mechanism in video decoder. The bits spent on decoding each block can vary highly substantially based on the nature of the particular block. Rate buffer 155 can smooth the rate variations in the compressed video. In some examples, a CBR buffer model is employed in which bits are taken out from rate buffer 155 at a constant bit rate.

As will be discussed in greater detail below, substream demultiplexer 160 may demultiplex the bitstream based on a headerless packet multiplexing scheme. This allows video decoder 30 to run three entropy decoders (e.g., as part of entropy decoder 165) in parallel, facilitating the decoding of three pixels per clock. Entropy decoder 165 decodes, in a reciprocal fashion to that of entropy encoder 140 of FIG. 2A, the compressed prediction residuals and any other data (e.g., syntax elements and indices) received from substream demultiplexer 160.

Rate controller 170 determines a set of coding parameters, including a QP. Quantization introduces loss in a signal and the amount of loss can be controlled by the QP. In some example, rate controller 170 may receive the QP from video encoder 20 in the compressed video bitstream. Rate controller 170 may supply the determined QP to predictor, quantizer, and reconstructor component 175.

Predictor, quantizer, and reconstructor component 175 may perform at least three decoding operations of video decoder 30. Predictor, quantizer, and reconstructor component 175 may be further configured to perform inverse quantization. For example, predictor, quantizer, and reconstructor component 175 may perform inverse quantization in accordance with the QP determined by rate controller 170.

Predictor, quantizer, and reconstructor component 175 may also perform a prediction decoding process (e.g., prediction mode) in a number of different coding modes. Example coding modes were discussed above with reference to predictor, quantizer, and reconstructor component 125 of FIG. 2A, though other coding modes may be used. Predictor, quantizer, and reconstructor component 175 may receive syntax elements in the compressed video bitstream to indicate the coding mode used for a particular block of video data or blocks of video data. Based on the coding mode, predictor, quantizer, and reconstructor component 175 may determine a predictive block for the currently decoded block. Predictor, quantizer, and reconstructor component 125 may also then perform reconstruction which includes adding the inverse quantized residual values to the determined predictive block to produce the decoded block.

It is noted that the above-described example approaches to prediction, quantization, and reconstruction performed by predictor, quantizer, and reconstructor component 175 are merely illustrative and that other approaches may be implemented. It is also noted that predictor, quantizer, and reconstructor component 175 may include subcomponent(s) for performing the prediction, the inverse quantization, and/or the reconstruction. It is further noted that prediction, the inverse quantization, and/or the reconstruction may be performed by several separate encoder components in lieu of predictor, quantizer, and reconstructor component 175.

Line buffer 185 is configured to store the output from predictor, quantizer, and reconstructor component 175 so that predictor, quantizer, and reconstructor component 175 and indexed color history 180 can use and/or store the buffered video data. Indexed color history 180 is a memory configured to store recently used pixel values. These recently used pixel values can be referenced directly by video decoder 30 via a dedicated syntax.

Color-space converter 190 may be configured to convert the color space using in the coding implementation to an output color-space to the color-space an output the video. For example, in one exemplary embodiment, the color-space of the output video data may be in the RGB color-space, while the coding process performed by video decoder 30 is implemented in the YCoCg color-space. The color-space conversion may be performed using any technique, including shifts and additions to the video data. It is noted that output video data in other color-spaces may be processed and conversions to other color-spaces may also be performed.

The following sections will discuss additional techniques for DSC and/or VDC-M coding in more detail. In one example for DSC and/or VDC-M, the QP for the current block (denoted as currQP) may be derived or calculated (e.g., by rate controller 120) based on the following equation:

$$currQP=prevQ+QpAdj*(diffBits>0?1:-1),$$

where prevQP is the QP associated with the previous block of video data, diffBits represents the difference between the previousBlockBits and targetBits, QpAdj is the QP offset value (e.g., QP adjustment value) that is calculated based on the magnitude of diffBits, previousBlockBits represents the number of bits used to code the previous block, and target-Bits represents a target number of bits in which to code the current block. When previousBlockBits is greater than targetBits, diffBits is positive, and the current block QP may be derived by adding the offset value QpAdj to the prevQP value. In other words, the QP value does not decrease in value from the prevQP value when diffBits is positive. When previousBlockBits is less than or equal to targetBits, diffBits is negative or zero, and currQP does not increase from the prevQP value. It is noted that the offset value QpAdj may be calculated, for example, as a function of diffBits in such a way that QpAdj monotonically increases as the magnitude of diffBits increases.

Figure 3:
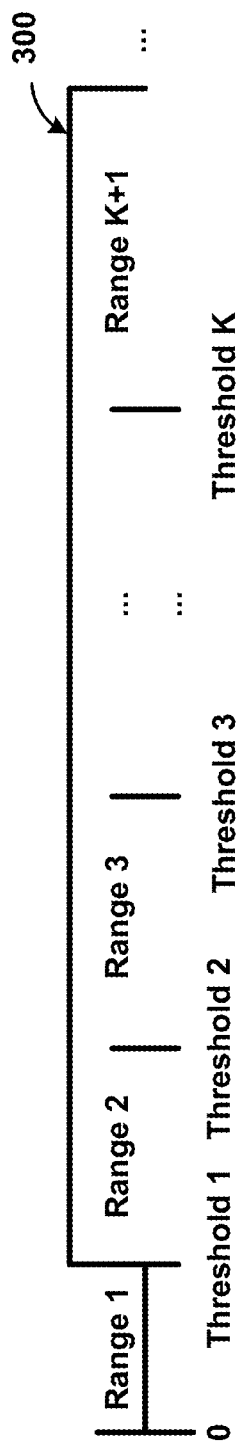
FIG. 3 is a graph illustrating one example techniques for computing a quantization parameter.

One technique, referred to herein as a default technique, for calculating the QP adjustment value QpAdj will now be described with reference to FIG. 3. FIG. 3 illustrates a graph 300 including an axis on which values of diffBits starting a zero are plotted. In the default technique, when diffBits>0, diffBits may be classified into K+1 ranges using K threshold values. These threshold values are illustrated by the labels Threshold 1, Threshold 2, Threshold 3, . . . , and Threshold K. The ranges are illustrated by the labels Range 1, Range 2, Range 3, . . . , and Range K+1. FIG. 3 shows one approach for segmenting diffBits into K+1 ranges using K threshold values. Each range may be associated with a specific QpAdj value, where the QpAdj value increases as the range index increases. When diffBits≤0, the absolute value of diffBits may be classified into J+1 ranges using J threshold values (not illustrated), and there may be a specific QpAdj value assigned for each of the J+1 ranges.

In other aspects, video encoder 20 may adjust the currQP value based on the fullness of rate buffer 150 (which may be represented in terms of buffer fullness BF), in order to prevent underflow and/or overflow of the buffer. In particular, when BF exceeds a certain threshold (e.g., $P_1$), video encoder 20 may increment the value of currQP by a fixed offset value (e.g., $p_1$). For example, video encoder 20 may adjust the value currQP as follows: currQP+=$p_1$. Further, when BF falls below a certain threshold (e.g., $Q_1$), video encoder 20 may decrement currQP by $q_1$, e.g., currQP-=$q_1$. In certain aspect, a plurality of thresholds may be employed, and for each threshold there may be a corresponding offset value to adjust currQP. When a transition from a complex region to a flat region is identified or when a flat region is identified, video encoder 20 may set the currQP to a low value (e.g., a value below a defined currQP value), as described in further detail below.

Referring back to FIGS. 2A and 2B, entropy encoder 140 and entropy decoder 165 may apply various types of entropy coding techniques. In one example, delta size unit-variable length coding (DSU-VLC) may be used. In DSU-VLC, video encoder 20 may encode the quantized residual values of a K-length sample vector (defined as "group") using prefix and suffix parts. The samples here refer to the value in a single color component. For example, for an RGB 444 color-space, each pixel has three samples. The prefix part may indicate the size of the residual value (the size is denoted as B bits) that follows the suffix part, and the suffix part may indicate the actual residual values of all samples in the unit. The K residual values in the group may be coded, for example, in two's complement using the same number of bits.

Figure 4A:
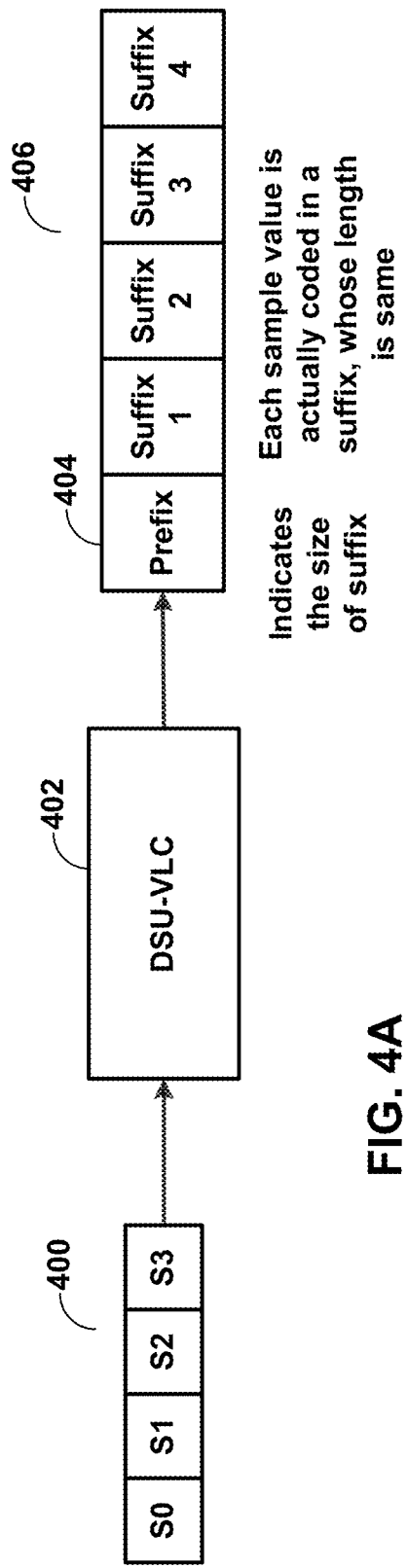
FIG. 4A is a conceptual diagram showing an example entropy coding technique.

With reference to FIG. 4A, there is shown an example DSU-VLC structure for a vector 400 with K=4 samples (samples S0, S1, S2, and S3). Entropy encoder 140 of video encoder 20 may include a DSU-VLC unit 402 configured to encode vector 400. When coding vector 400, DSU-VLC unit 402 may produce a prefix 404 that indicates the size of the suffix 406. DSU-VLC unit 402 may further produce a suffix 406 (e.g., suffix 1, suffix 2, suffix 3, suffix 4) that encodes each sample value of vector 400 with the same length.

Figure 4B:
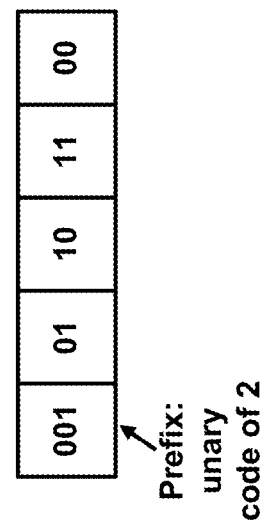
FIG. 4B is a conceptual diagram showing an example codeword.

As an example, the size to code a group of four samples having values [1, −2, −1, 0] may be B=2 bits, using two's complement representation. An example of a DSU-VLC code is shown in FIG. 4B, where 001 represents the unary code of the prefix, and [01, 10, 11, 00], respectively, represent the actual coded sample value using two bits. By decoding the prefix, usually done in a single clock, all of the four symbols may be decoded.

In another example, a high throughput entropy coding technique may be implemented (e.g., via the entropy encoder 140 of the video encoder 20 and/or the entropy decoder 165 of the video decoder 30) to provide, for example, a throughput of four samples/clock. The high throughput entropy coding technique may involve partitioning the quantized residual of the samples within a given block (e.g., having block size P×Q) into N groups, and then coding the group samples using DSU-VLC. The partitioning of a block of samples into N groups may be uniform or non-uniform.

Figure 5:
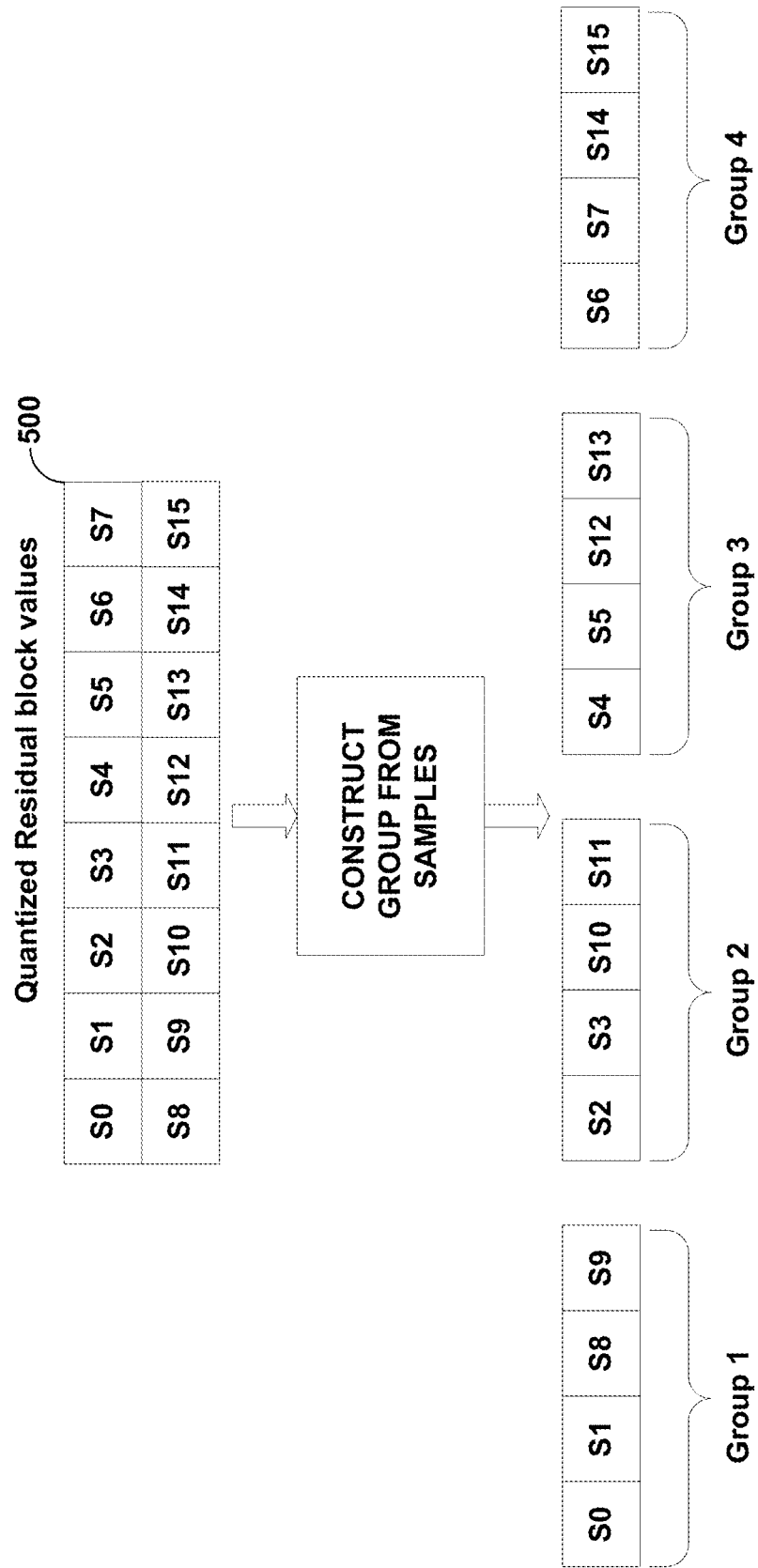
FIG. 5 is a conceptual diagram illustrating quantized residual block groups according to one example of the disclosure.

With uniform grouping, the N groups each have an equal number of samples, and the samples may be used in BP mode, DPCM mode, etc. FIG. 5 illustrates an example approach to uniform grouping, where a 2×8 block 500 of quantized residual block values is partitioned into four groups, with each group having four samples. With non-uniform grouping (not illustrated), the number of samples in each group may be different, and the samples may be used in transform mode.

Techniques for substream multiplexing (SSM) have been proposed for DSC and VDC-M. In general, SSM involves breaking the bitstream of encoded video data into substreams based on common characteristics (e.g., each color component may be a substream). In one example, a headerless SSM technique may be implemented to multiplex multiple substreams into a single stream using, for example, fixed length words (e.g., mux words). That is, video encoder 20 may be configured to transmit packets (e.g., mux words) of a fixed sized (e.g., as indicated by the syntax muxWordSize). The mux words may be derived and placed in the single stream in such a way that the decoders can decode multiple substreams in parallel.

In one example, each color component of the video data may be considered as a substream, e.g., luminance (Y), chrominance orange (Co), and chrominance green (Cg), such that a total three substreams are present. In related aspects, the mux word size (muxWordSize) may be dependent on the number bits used per component (bpc), e.g., 48 bits for 8 bpc and for 10 bpc, 64 bits for 12 bpc, etc. In further related aspects, a mux word size may be set to be greater than or equal to the maximum syntax element size (maxSeSize), where maxSeSize refers to the maximum possible size of a single component worth of compressed data for one group. This means that video decoder 30 may be configured to request at most one mux word from each substream in order to decode a single group.

Figure 6A:
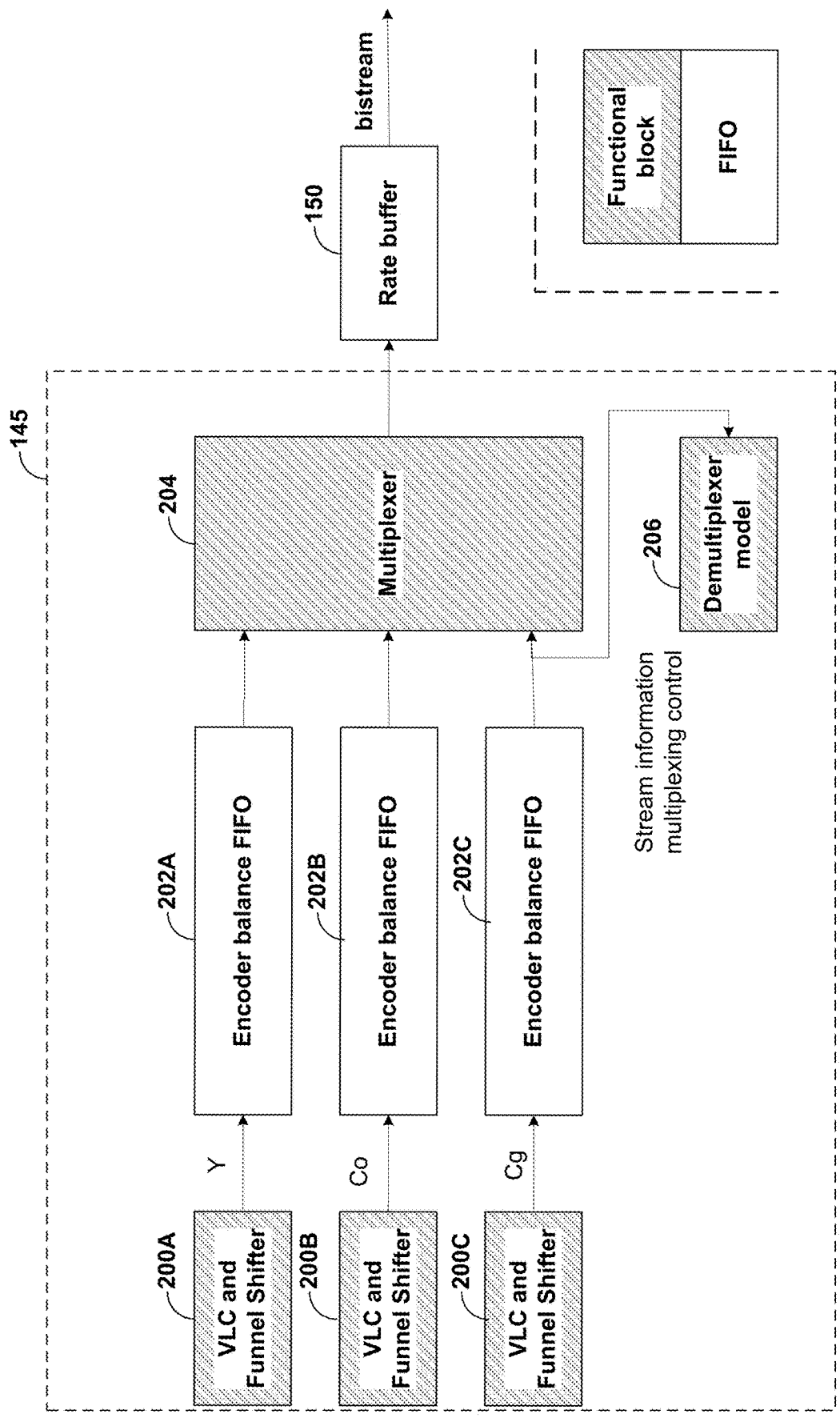
FIG. 6A is a block diagram showing substream multiplexing in a video encoder according to one example of the disclosure.
Figure 6B:
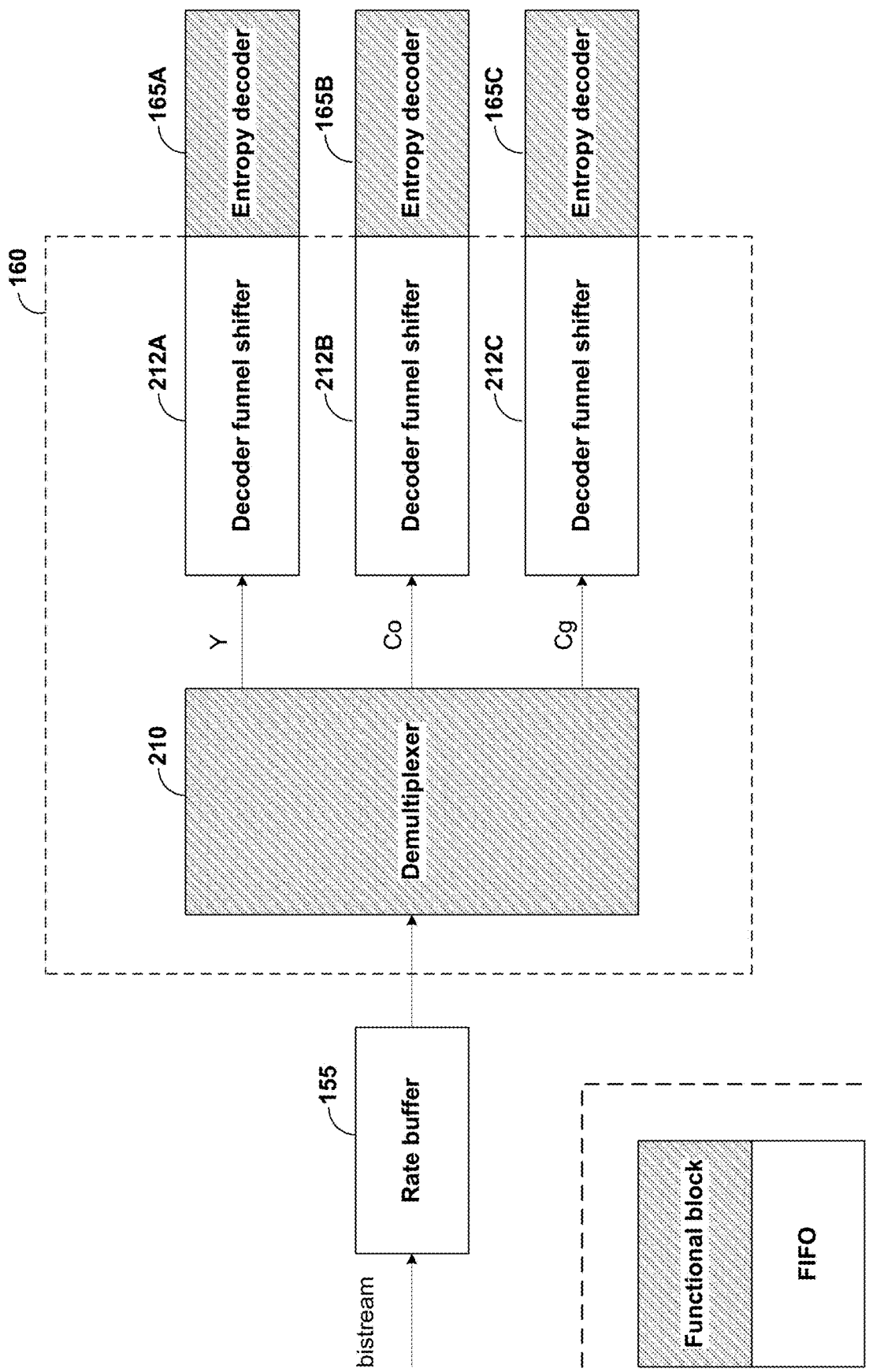
FIG. 6B is a block diagram showing substream demultiplexing in a video decoder according to one example of the disclosure.

FIG. 6A illustrates components for performing one or more examples aspects of SSM at an encoder (e.g., substream multiplexer 145 of video encoder 20). On the encoder side, SSM may involve using a balance first-in, first-out (FIFO) approach for each substream that stores multiple groups (e.g., each group containing 3 pixels) of encoded data. As the mux words are derived to facilitate parallel decoding, a demultiplexer model 206 may be implemented at video encoder 20. FIG. 6B illustrates components for performing one or more example aspects of SSM at a decoder (e.g., substream demultiplexer 160 at video decoder 30). On the decoder side, the demultiplexer model may include three or more funnel shifters (e.g., a funnel shifter for each substream) and entropy decoders 165A, 165B, 165C (one for each substream) that decodes the color components in parallel. Entropy decoders 165A, 165B, 165C may be part of entropy decoder 165 of FIG. 2B. The combination of funnel shifter and entropy decoder may be called as substream processor (SSP). At each group time (or block time), each SSP may request one mux word or none. In DSCv1.x, operations are performed on a group of the samples. As such, the time at which a group of 3 samples is encoded may be called group time. In examples of this disclosure, encoding and decoding may be performed on a larger block of samples (e.g., an 8×2 block of samples). The time at which a block of samples is encoded may be called block time. A mux word may be requested by an SSP when the number of bits in the funnel shifter is strictly smaller than maxSeSize. In FIGS. 6A and 6B, the shaded blocks are functional blocks, which may be implemented in hardware, firmware, software, or any combination thereof. The non-shaded blocks are buffers (e.g., FIFO buffers).

Returning to FIG. 6A, video encoder 20 may include a variable length coder (VLC) and funnel shifter 200A, 200B, and 200C (collectively, "VLC and funnel shifters 200"), respectively, for each color component of the video data being processed (e.g., Y, Co, and Cg color components). In some examples, the VLC function of VLC and funnel shifters 200 may be executed by entropy encoder 140 of FIG. 2A. VLC and funnel shifters 200 may be configured to apply VLC encoding (e.g., DSU-VLC) to each color component of a block of video data. VLC and funnel shifters 200 may include funnel shifters to move coded video data to encoder balance FIFO 202A, 202B, and 202C (collectively, encoder balance FIFOs 202). In general, a shifter is a digital circuit that can shift a data word by a specified number of bits. A funnel shifter is a shifter that has a larger number of input bits than output bits. That is, not all bits input to the funnel shifter are output at each clock cycle. Encoder balance FIFOs 202 store mux words for later transmission to video decoder 30.

When a mux word request is received from the SSP of video decoder 30, multiplexer 204 may place a single mux word from one of encoder balance FIFOs 202 into rate buffer 150. For example, when a request is made for a Y component mux word from the SSP of video decoder 30, then multiplexer 204 may move a mux word Y encoder balance FIFO 202A and placed in rate buffer 150 for sending in the bitstream. For a given group time, multiple requests can be received from the SSPs (at most one for each substream) of video decoder 30. In such scenarios, the requested mux words may be placed into rate buffer 150 in a specific order (e.g., where Y is given the highest priority, followed by Co, and then followed by Cg). Multiplexer 204 may be configured to place mux words into rate buffer 150 in a specific order based on demultiplexer model 206. Demultiplexer model 206 is a model of how the SSM process is carried out by video decoder 30. In this way, video encoder 20 may determine in which order video decoder 30 will request mux words (e.g., the order of mux words from the specific substreams), and multiplexer 204 may then place the mux words in rate buffer 150 based on the determined order supplied by demultiplexer model 206.

The balance FIFO size of encoder balance FIFOs 202 may be predetermined or set to prevent overflow or underflow of bits at rate buffer 150. In general, the balance FIFO size may be dependent on the difference between the maxSeSize and minimum syntax element size (minSeSize), as well as the size of a mux word (e.g., as indicated by the variable muxWordSize. The maximum and minimum syntax elements sizes may be predetermined and video encoder 20 may be configured to code blocks of video data such that the coding mode selected results in a syntax element for each substream is between the minimum and maximum syntax element sizes, inclusive.

In one example, at the beginning of a slice, encoder balance FIFOs 202 may be filled with (muxWordSize+maxSeSize−1) groups of data. This may correspond to an initial delay period, during which time no mux words are transmitted to video decoder 30 (e.g., called an SSM delay time). In order to prevent overflow, each of encoder balance FIFOs 202 may be configured to store (muxWordSize+maxSeSize−1)*maxSeSize bits. In order to prevent underflow, the FIFO size may be calculated such that each of encoder balance FIFOs 202 contain one mux word worth of data whenever a request is made from video decoder 30 (e.g., as indicated by demultiplexer model 206).

At the beginning or encoding, for muxWordSize+maxSeSize−1 groups, encoder balance FIFOs 202 may be filled with coded bits without removing any mux words. After this initial delay, multiplexer 204 may remove one mux word from each of balance FIFOs 202 and sent to rate buffer 150. In addition, multiplexer 204 may place these mux words in the respective funnel shifters of demultiplexer model 206. For each group time, in demultiplexer model 206, the number of bits in the funnel shifter may be reduced by the size of the syntax element.

In general, the syntax element size may refer to the number of bits required to decode a single substream's worth of data in a single block. In one example, a syntax element may refer to a single component worth of data in a single block, as each component may belong to a separate substream. One purpose of demultiplexer model 206 at video encoder 20 is to mimic the actual decoding at video decoder 30, such that video encoder 20 places mux words into the bitstream in the correct order for video decoder 30. The funnel shifter fullness may be reduced depending on the number of bits required to decode one group at the time. When the funnel shifter fullness falls below the maximum syntax element size (maxSeSize), video decoder 30 (and demultiplexer model 206) may make a request to add a mux word to the funnel shifter. The same mux word may also be sent to rate buffer 150. This process (of decrementing each funnel shifter fullness by the corresponding syntax element size and requesting a mux word when fullness of the funnel shifter is less than the maxSeSize) may proceed until each block in the slice is finished encoding. In some examples, at the end of the slice, an encoder balance FIFO 202 may not contain enough bits to form a single mux word or may be empty. In such cases, zero padding may be performed to fulfill the mux word.

As shown in FIG. 6B, rate buffer 155 may receive and store data from the bitstream. Multiplexer 210 may read mux words from rate buffer 155 and place them in one of decoder funnel shifter 212A, 212B, or 212C (collectively, decoder funnel shifters 212), in the order in which the mux words were requested. That is, multiplexer 210 may direct received mux words to the appropriate decoder funnel shifter 212 based on which substream had requested the mux word. The mux words for each substream may then be entropy decoded by one of entropy decoders 165A, 165B, or 165C (e.g., entropy decoder 165 of FIG. 2B).

In one example SSM implementation, video encoder 20 is configured to enforce the maxSeSize for each block. If the total syntax for any given substream exceeds maxSeSize for a given coding mode, then video encoder 20 may be configured to disallow the coding mode during mode selection that resulted in the syntax exceeding the maxSeSize. In addition, midpoint prediction (MPP) coding mode is designed to guarantee that the syntax never exceeds maxSeSize, such that at least one mode will always be available to mode selection. By this mechanism, maxSeSize can be tuned for different use-cases. One example of SSM coding is described in U.S. Patent Publication No. 2017/0359583, filed Jun. 8, 2017.

One issue with some example DSC SSM techniques is that the size of the encoder balance FIFO (e.g., encoder balance FIFOs 202) grows with the difference between the maxSeSize and minSeSize. Again, in the context of this disclosure, a syntax element size may refer to the number of bits used to encode and decode a single substream's worth of data in a single group. In one example, a syntax element may refer to a single component worth of data in a single block, as each component may belong to a separate substream. The balance FIFO size given the maxSeSize and minSeSize parameters is computed as described below.

Video encoder 20 may be configured to wait for a delay time (ssmDelay), in terms of a number of block-times, at the beginning of a slice. During this time, video encoder 20 places bits into the SSM balance FIFO (e.g., encoder balance FIFOs 202), but no bits are removed. Essentially, this is a buffering period to ensure that enough bits exist in the SSM balance FIFO before transmission begins. To ensure that the SSM balance FIFO does not underflow, video encoder 20 stores the following number of bits (requiredBits) n the balance FIFO before transmission can begin: "requiredBits"=("maxSeSize"+"muxWordSize"−1).

In the worst case, a balance FIFO will fill at a rate of minSeSize per block-time. Assuming this worst-case behavior, the SSM delay (measured in block-time) is calculated as: "ssmDelay"=ceil("requiredBits"/"minSeSize")

Given ssmDelay, the parameter balanceFifoSize is determined such that the balance FIFO does not overflow. This would be the case if every block during the SSM delay period has maxSeSize bits. The balance FIFO size is computed as:

"balanceFifoSize"="ssmDelay"*"maxSeSize"

For example, suppose the following configuration:
minSeSize=1
maxSeSize=142
muxWordSize=144

From this configuration, balanceFifoSize is calculated as:

"requiredBits"=("maxSeSize"+"muxWordSize"−1)=
(142+144−1)=285

"ssmDelay"=ceil("requiredBits"/"minSeSize")=ceil
(285/1)=285

"balanceFifoSize"="ssmDelay"*"maxSeSize"=
285*142=40470(approx. 40 kbit)

Since multiple substreams are used for some example DSC techniques, including VDC-M, the hardware cost of having 40 kbit of RAM per balance FIFO is undesirable. For DSCv1.x, the balance FIFO size is small because maxSeSize is small (e.g., 36 bits)—a result of DSCv1.x having a small group size of 3 samples. For VDC-M or other example video codec, the maxSeSize may be larger (e.g., 126 or 142 bits) due to the use of larger block sizes (e.g., 8×2 samples).

This disclosure describes SSM encoding techniques that result in decreasing a size requirement of encoder balance FIFOs (balanceFifoSize). In one example, the balanceFIFO-Size may be decreased by performing SSM according to a minimum syntax element size (minSeSize) that is greater than 1. For example, video encoder 20 may be configured to determine a coding mode for coding a block of video data such that the minimum syntax element size for each of the substreams is at least two bits in size. In one example, video encoder 20 may be configured to disallow any coding modes that produce a syntax element for at least one substream that is less than two bits. In another example, video encoder 20 may be configured to encode syntax elements for all available coding modes such that the minimum syntax element size produced for each substream with each coding mode is two bits or greater.

In one example, minSeSize is increased from one bit to two bits. By doing this, the balanceFifoSize may be reduced by approximately 50%. To guarantee a minSeSize of 2, video encoder 20 may be configured to enforce bitstream syntax changes, as is described below. In addition, this disclosure describes SSM techniques to increase the decoding throughput of 4:2:2 and 4:2:0 chroma sub-sampling format source content by encoding one or more additional substreams in relation to four substream DSC techniques. This disclosure also describes a further modification to SSM techniques to reduce balanceFifoSize for substreams which have a non-uniform maxSeSize.

In one example SSM technique of this disclosure, the minSeSize is increased to be more than 1 bits. In one example, video encoder 20 is configured to perform SSM techniques for a minSeSize of 2 bits. By doing this, the required balanceFifoSize is reduced. This can be shown by revisiting the example from before.

"requiredBits"=("maxSeSize"+"muxWordSize"−1)=
(142+144−1)=285

"ssmDelay"=ceil("requiredBits"/"minSeSize")=ceil
(285/2)=143

"balanceFifoSize"="ssmDelay"*"maxSeSize"=
143*142=20306(approx. 20 kbits)

Therefore, by increasing minSeSize by one bit, the balanceFifoSize is reduced by slightly less than half. This trend will continue for an even larger minSeSize (e.g., 3 bits or more). However, increasing minSeSize may, in some examples, have a negative impact on coding efficiency at larger sizes of minSeSize. For this reason, this disclosure proposes using minSeSize=2 as a good trade-off between performance and balance FIFO size. If a smaller balance FIFO size is more valued than coding efficiency, a larger value of minSeSize may be used.

In one example of the disclosure, in order to enforce a minimum syntax element size of two, video encoder 20 may be configured to disallow any coding mode that produces a syntax element of less than two bits for any substream. For example, rate controller 120 of video encoder 20 may be configured to determine a coding mode to use to encode a block of video data. As described above, rate controller 120 may determine a coding mode using a rate-distortion model. In addition, rate controller 120 may determine whether or not to use a coding mode based on a predetermined maximum syntax element size (maxSeSize) and a minimum syntax element. For example, rate controller 120 may be configured to disallow (e.g., not use) any coding mode that produces a syntax element for any of the substreams that is greater than maxSeSize. In addition, rate controller 120 may be configured to disallow (e.g., not use) any coding mode that produces a syntax element for any of the substreams that is less than minSeSize. In some example coding modes, the size of the syntax element for one of the substreams, after encoding, may be less than two. Rather controller 120 may be configured to disallow such a coding mode.

In other examples of the disclosure, video encoder 20 may be configured to apply syntax changes to ensure that the minSeSize is at least two bits for all blocks of all substreams for all of the available coding modes. That is, video encoder 20 may be configured to encode at least two bits per substream for any coding mode that video encoder 20 is configured to use. Some coding modes used for DSC and other CBR video codecs may not fit this constraint. In examples of this disclosure, video encoder 20 may be configured to apply syntax changes (i.e., code video data using a specific syntax structure) for transform mode, block prediction (BP), and BP-SKIP modes such that minSeSize is always two bits or greater for all substreams. MPP and MPPF modes already guarantee this constraint by design, since these modes evenly distribute residuals among all substreams. No changes need to be made to guarantee minSeSize is greater than or equal to two for substream 0 (i.e., the substream with header and mode information), since each block will include at least two bits of syntax in substream 0 for the block header and flatness header. Example data contained in substreams 0-3 are described in more detail below with reference to FIGS. 13-19.

In transform mode, video encoder 20 may be configured to encode header information (e.g., mode signaling and flatness signaling), an intra prediction index, and/or a transform partition index in substream 0. Video encoder 20 may encode coded information from the three color components (e.g., Y, Co, and Cg, respectively) in substreams 1, 2, and 3. Substream 1 includes coded information for the Y color component. Substream 2 includes coded information for the Co color component. Substream 3 includes coded information for the Cg color component.

Among the coded information in substreams 1, 2, and 3 are entropy coding groups for each color component. Entropy coding (EC) groups may be used for both the transform coding mode and the block prediction coding mode. For block prediction coding mode, the EC groups may include quantized prediction residuals. The prediction residuals are the difference between the color components of the block being coded and the predictive block. The quantized prediction residuals may be entropy coded by entropy encoder 140 before being placed in a substream. For the transform coding mode, the EC groups includes transform coefficients produced after applying a transform (e.g., a discrete cosine transform) to a particular color component of a block. The transform coefficients may be quantized. The transform coefficients in an entropy coding group may be entropy coded by entropy encoder 140 before being placed in a substream. In addition, among the coded information in substreams 2 and 3 is a component skip flag. The component skip flag may be used to indicate if all values of the associated color component are zero for a particular block. In this case, there will be no data in the entropy coding group for that particular color component.

To guarantee that the minSeSize is greater than or equal to two for transform mode, video encoder 20 may be configured to modify the syntax coding for the component skip flag for substreams 2 and 3 when coding data in transform mode. As discussed above, substreams 2 and 3 correspond with the two chrominance components (either Co/Cg or Cb/Cr depending on the source color space). No syntax changes are required for substream 1 (e.g., the luminance (Y) substream), as the minimum possible syntax for this component is four bits due to a lack of component skip flag.

Video encoder 20 may be configured to make the following syntax change for substreams 2 and 3. If component skip mode is not active (i.e., at least one entropy coding group of data will be coded and signalled) then the component skip flag may be signaled with a value of "0." In this case, at least one bit will be sent in the entropy coding group(s), which guarantees a total of at least 2 bits. If component skip is active (i.e., there is no data in the entropy coding group for that color component), then the component skip flag will be signaled with two or more bits (e.g., with a value of "11"). Since the component skip flag is the only syntax for this substream under component skip, the increase in the flag size from 1 bit (e.g., "1") to 2 bits (e.g., "11") is sufficient to guarantee minSeSize.

|  | Component skip inactive | Component skip active |
|---|---|---|
| Current | "0" | "1" |
| Proposed | "0" | "11" |

Figure 7:
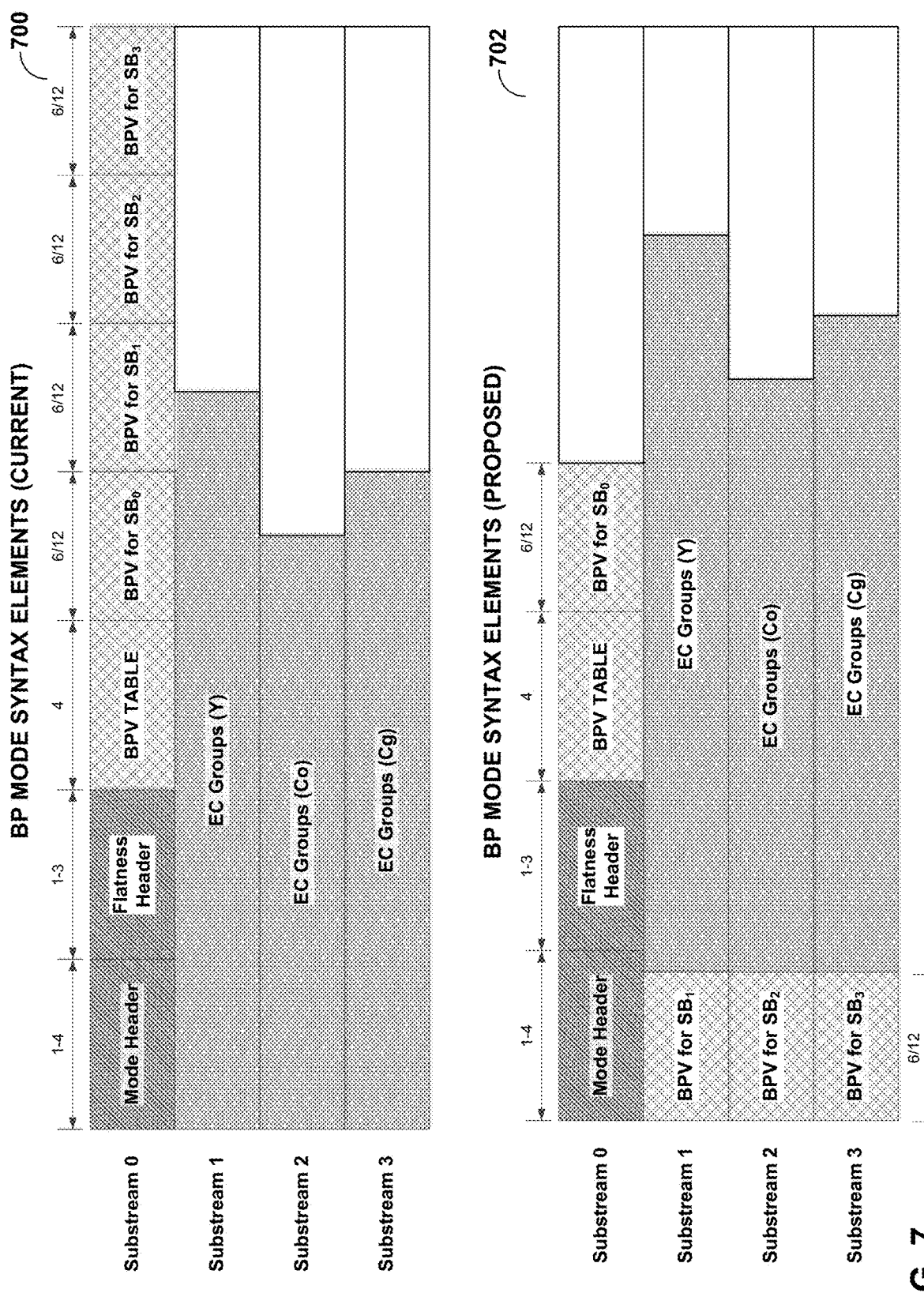
FIG. 7 is a conceptual diagram showing a block prediction vector distributed among four substreams.

To guarantee minSeSize is greater than or equal to 2 for BP and BP-SKIP modes, video encoder 20 may be configured to rearrange the block prediction vectors (BPVs) among the four substreams as shown in FIG. 7. As shown syntax structure 700 in FIG. 7, substream 0 for BP mode may include a mode header, a flatness header, a block prediction vector (BPV) table, and a BPV for each of four 2×2 sub-blocks ($SB_0$, $SB_1$, $SB_2$, and $SB_3$) of the block being coded. The mode header may be between 0 and 4 bits. The flatness header may be between 1 and 3 bits. The BPV table is a 4-bit field which specifies whether each 2×2 sub-block within a current block (e.g., an 8×2) is coded with 1 or 2 BPVs. For example, if the first bit of the BPV table is "0," then a single BPV (5/6 bits) will be present in the syntax for sub-block 0. If the bit is "1" instead, then two BPVs (10/12 bits) will be present in the syntax for sub-block 0. The same logic applies to sub-blocks 1, 2 and 3. Accordingly, each of the BPVs for the four sub-blocks may be 6 or 12 bits in length. In another example, a "0" bit in the BPV table might specify 2 BPVs, while a "1" bit specifies a single BPV. In one example BP implementation, the BPV table and all BPVs for all sub-blocks are in substream 0. This is shown in the top of FIG. 7.

In syntax structure 700, substream 1 includes the EC groups for Y color components, substream 2 includes the EC groups for Co color components, and substream 3 includes the EC groups for Cg color components. In BP mode, the EC groups include the quantized residual data produced from predicting the sub-blocks of the current block from samples of a predictive block identified by the respective BPVs. In some examples, the EC groups for a particular substream may include less than two bits. Such a situation may occur when all of the quantized residuals for a component are zero. In this case, a 1-bit component skip flag will be used for the component.

In a proposed BPV distribution in syntax structure 702 (bottom of FIG. 7), video encoder 20 encodes the BPV table in substream 0 along with the BPVs for sub-block 0. However, video encoder 20 is configured to encode the BPVs for sub-blocks 1-3 in substreams 1-3. Since each of the BPV is at least 5 bits, syntax structure 702 will guarantee that all substreams have a minSeSize greater than 2 bits.

Figure 8:
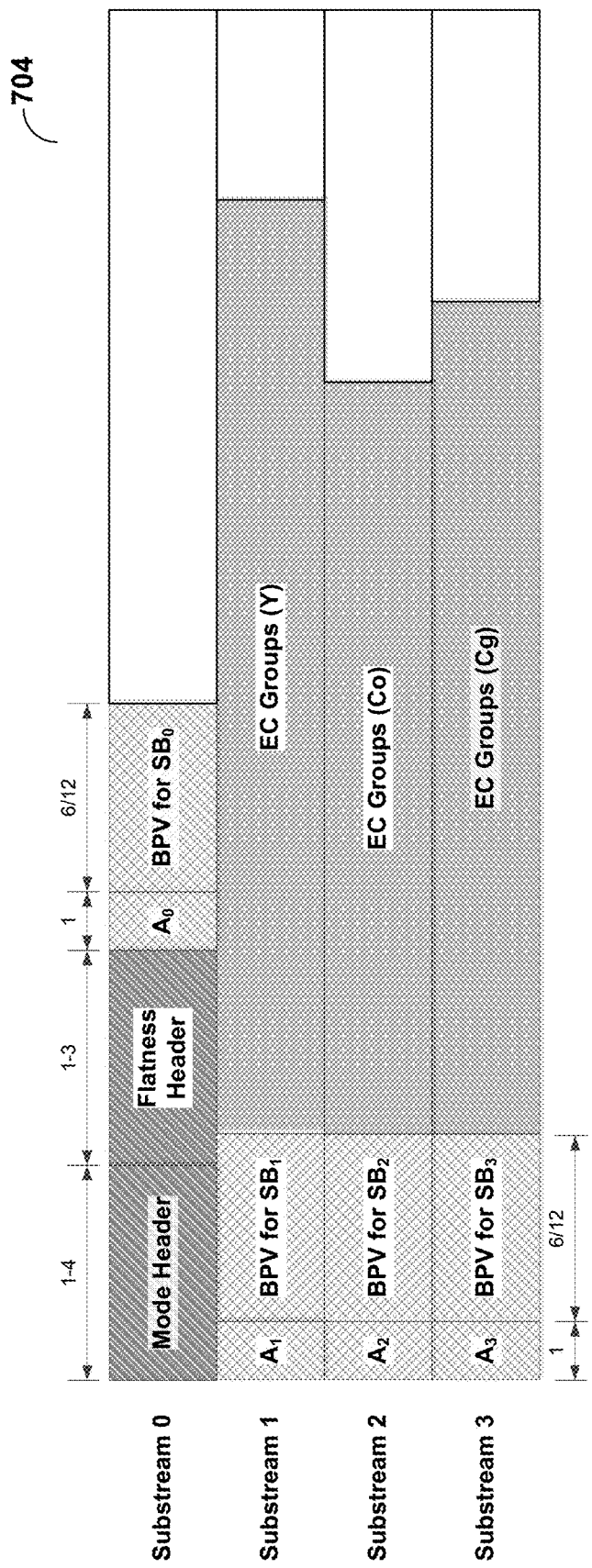
FIG. 8 is another conceptual diagram showing a block prediction vector distributed among four substreams.

In another example, the BPV table is also distributed among the available substreams (see FIG. 8). Syntax structure 704 of FIG. 8 shows the BPV table being divided into individual entries (e.g., A0-A3) for each of sub-blocks 0-3. Since the BPV distribution guarantees a minSeSize of at least two, any component skip flag may remain unchanged for BP mode. For example, an active component skip is signaled as "1" and inactive component skip is signaled as "0."

In another example of the disclosure, video encoder 20 may be preconfigured with a variable maxSeSize that may be chosen based on a desired compressed bitrate. For low compression ratios, video encoder 20 may be configured with a relatively larger maxSeSize, as the bitstream is expected to contain larger syntax elements. Video encoder 20 may be configured with a relatively smaller maxSeSize for higher compression ratios. By increasing the minSeSize from 1 to 2, the reduction in balance FIFO sizes shown in Table 1 of FIG. 9 can be realized. As such, as can be seen in FIG. 9, the encoder balance FIFO size may be determined based preconfiguring both a maxSeSize and a minSeSize.

Figure 10:
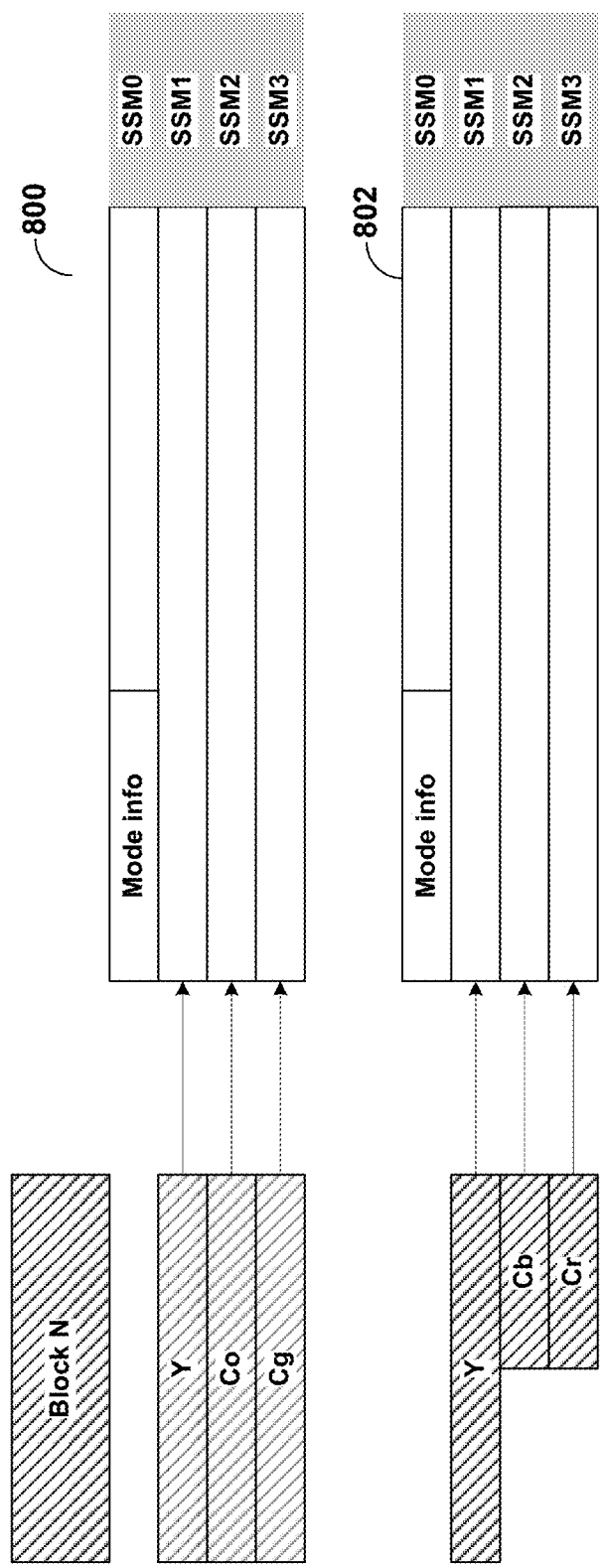
FIG. 10 is a conceptual diagram showing an example substream construction for 4:4:4 and 4:2:2 chroma sub-sampling formats.

In another example of the substream multiplexer design discussed so far, five substreams may be used instead of four to increase decoder throughput for 4:2:2/4:2:0 chroma-subsampled data. In one example, the distribution of component data into substreams is shown in FIG. 10. Syntax structure 800 shows the use of four substream for 4:4:4 RGB data. Syntax structure 802 shows the use of four substreams for 4:2:2 YCbCr data. The data for each component k is mapped to substream (k+1).

Figure 11:
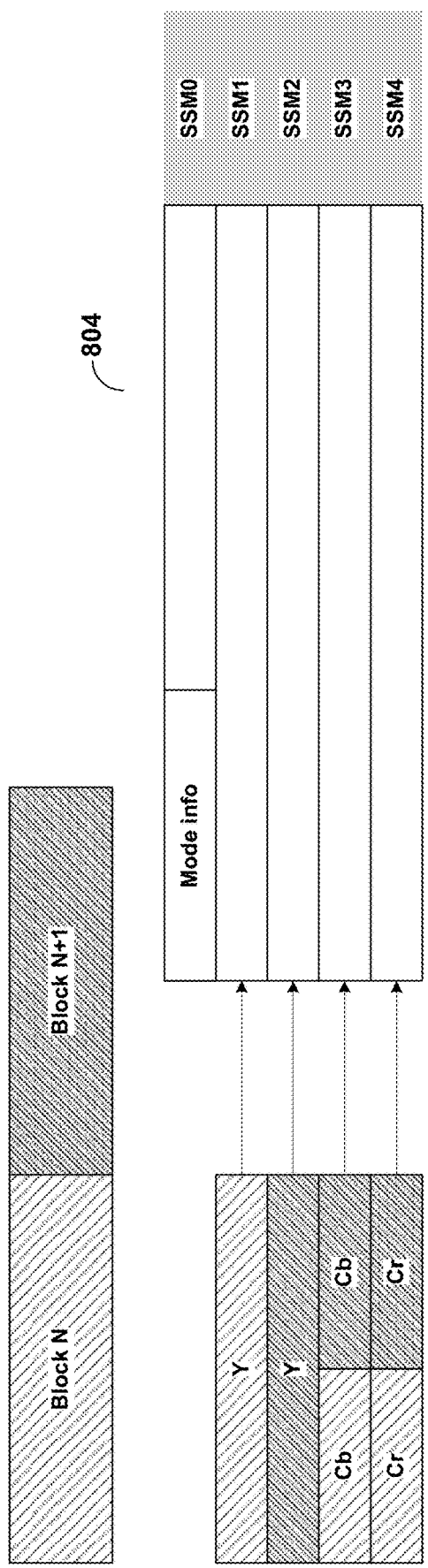
FIG. 11 is another conceptual diagram showing an example substream construction for a 4:2:2 chroma sub-sampling format.

For 4:2:2 source content, data can be organized, instead, as shown in syntax structure 804 of FIG. 11. Given two adjacent 8×2 blocks (i.e., block N and block N+1), the total component data will be as follows:

$Y$ data:2×(8×2)=32"samples"

$Cb$ data:2×(4×2)=16"samples"

$Cr$ data:2×(4×2)=16"samples"

As shown in syntax structure 804, video encoder 20 may encode coding mode-specific information in substream 0 (SSM0). Video encoder 20 may encode luminance data (Y) of block N in substream 1 (SSM1) and may encode luminance data (Y) of block N+1 in substream 2 (SSM2). Video encoder 20 may encode blue chrominance data (Cb) for both block N and block N+1 in substream 3 (SSM3). Video encoder 20 may encode red chrominance data (Cr) for both block N and block N+1 in substream 4 (SSM4). By splitting the luminance data between two substreams, there will be a total of 16 samples of component data for each of the four substreams SSM1-SSM4. Also, considering SSM0 for coding mode-specific information gives five substreams total. In this design, video decoder 30 is effectively decoding two blocks during a single block-time; thereby doubling the throughput. The same idea can be directly applied to 4:2:0 source data.

In another example of the disclosure, the size of the encoder balance FIFO can be further reduced for certain substreams if those substreams have a smaller maxSeSize. For example, in certain instances, the possible syntax size for substream 0 may be less than substreams 1-3. Consider, for example, a case where the maxSeSize=126 for substream 0 and maxSeSize=142 for substreams 1-3. In this case, the balance FIFO for substream 0 can be reduced. However, it may also be beneficial to maintain a constant delay for all substreams, to avoid additional buffering issues. In FIG. 12, the balance FIFO size for substreams 1-3 will be 20,306 bits (row A). For substream 0, the balance FIFO size will be 18,018 bits (row C). It may be beneficial to avoid the balanceFIFOSize of row B, since this may cause an ssm-Delay mismatch between the substreams. Therefore, we can reduce the required balance FIFO size for substream 0 from 20,306 bits to 18,018 bits (11.3% reduction) taking advantage of the difference in maxSeSize between substreams.

In accordance with one or more examples of the present disclosure, the substreams in SSM may be constructed for various modes by considering the following aspects.

There may be a minimum dependency among substreams so that all the substreams may be parsed and decoded in parallel. Even if there exists some dependency, the dependent information is signaled early in the substreams, so that the wait time or critical path can be reduced. For example, the mode information bits may be signaled first in the substream 0, so that once it is decoded, the remaining substreams can use it to parse and decode the information.

In one specific implementation, for certain modes used in display stream compression, four substreams may be utilized and constructed as described herein. In the present example, the block size is assumed to be 2×8 (width: 8 pixels, height: 2 pixels).

Figure 13:
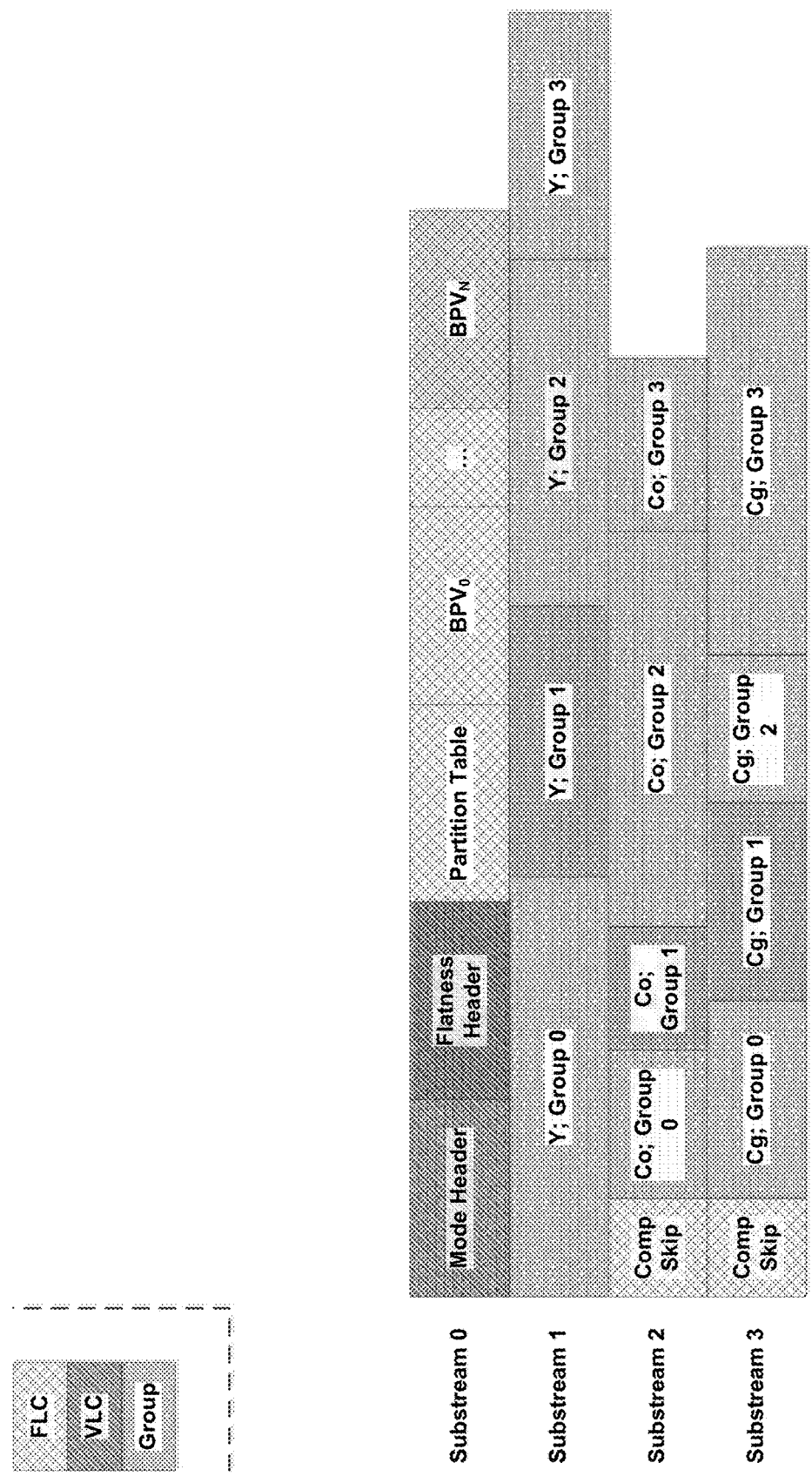
FIG. 13 is a conceptual diagram showing an example substream construction for block prediction mode.

BP Mode: As shown in the example of FIG. 13, for BP mode, substream 0 may contain header information (e.g., mode signaling and flatness signaling), partition information (e.g., a partition table), and/or block prediction vectors. The partition information length is 4 bits, which indicates whether each 2×2 sub-blocks is further partitioned into 1×2 sub-blocks. Substreams 1, 2, and 3 may contain coded information from the three color components (e.g., Y, Co, and Cg, respectively). As discussed above, in some examples, block prediction vectors may be distributed in all four substreams when coding in BP mode. In other examples, block prediction vector tables may be distributed in all four substreams when coding in BP mode. In other examples, both block prediction vectors and block prediction vector tables may be distributed in all four substreams when coding in BP mode. For example:

1) BPV table and BPVs in substream 0;
2) BPV table in substream 0, BPVs distributed in all four substreams; or
3) BPV table and BPVs distributed in all four substreams.

Figure 14:
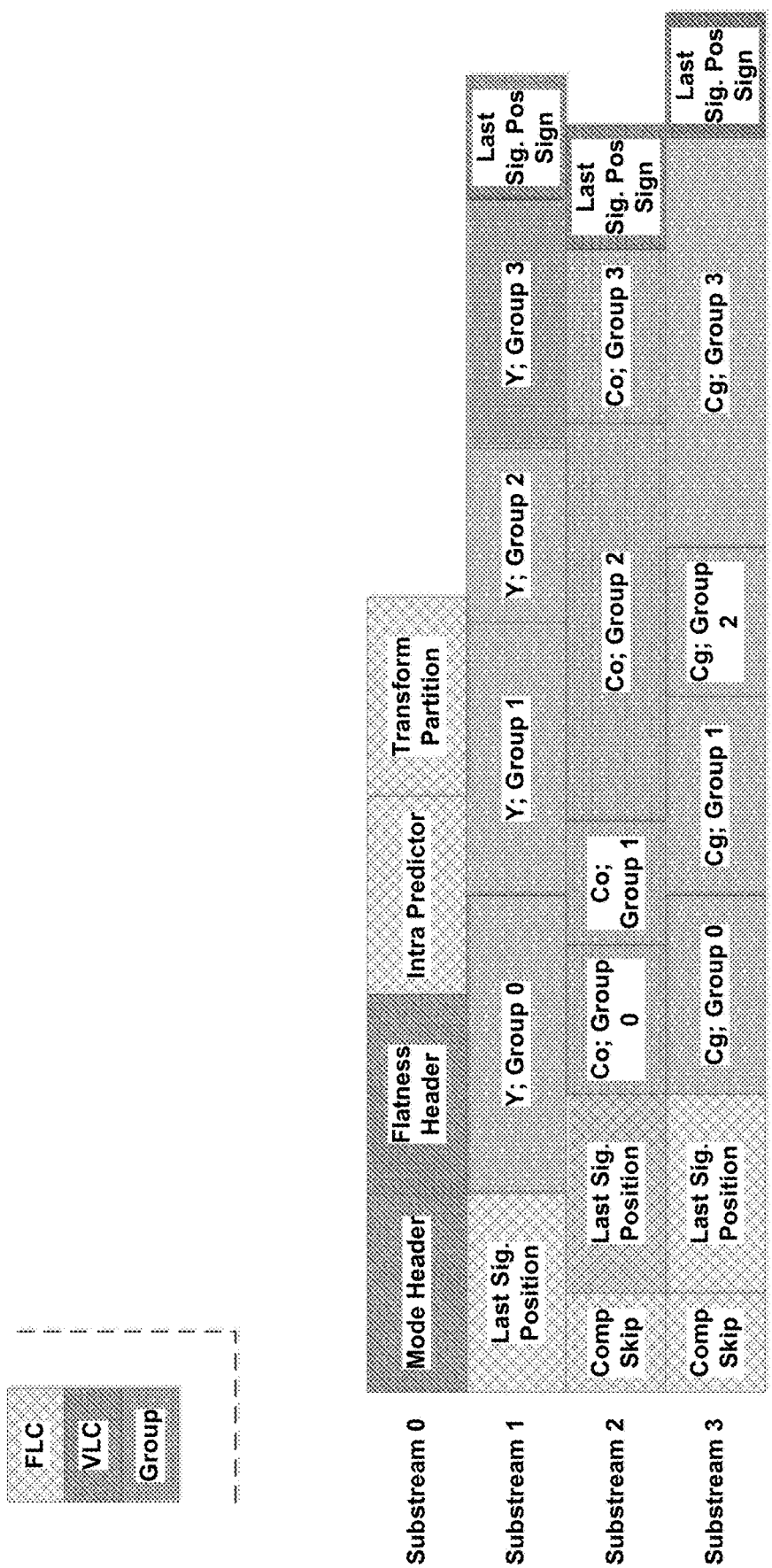
FIG. 14 is a conceptual diagram showing an example substream construction for transform mode.

Transform Mode: As shown in the example of FIG. 14, for transform mode, substream 0 may contain header information (e.g., mode signaling and flatness signaling), an intra prediction index, and/or a transform partition index. Substreams 1, 2, and 3 may contain coded information from the three color components (e.g., Y, Co, and Cg, respectively).

Figure 15:
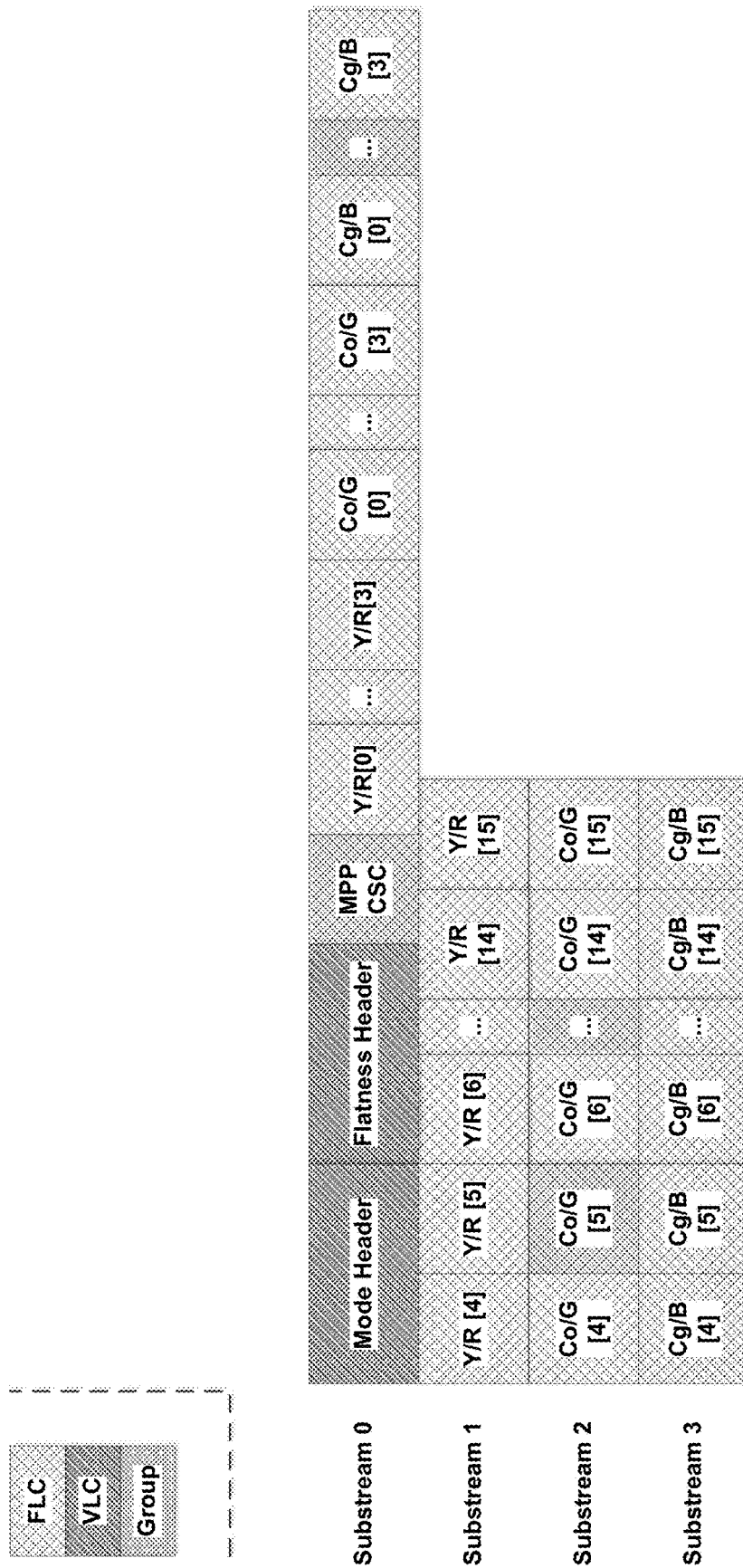
FIG. 15 is a conceptual diagram showing an example substream construction for mid-point prediction mode.

MPP Mode: As shown in the example of FIG. 15, for MPP mode, substream 0 may contain header information (e.g., mode signaling and flatness signaling), a color space used for MPP mode (e.g., color space conversion (CSC)), and/or four samples from each of the three color components. In one example, the four samples may be the first four samples. Substreams 1, 2, and 3 may contain coded information from the remaining twelve samples from the three color components. Depending on the color space used for MPP mode, the three color components can be, for example, Y, Co, and Cg, respectively (or R, G, and B, respectively).

Figure 16:
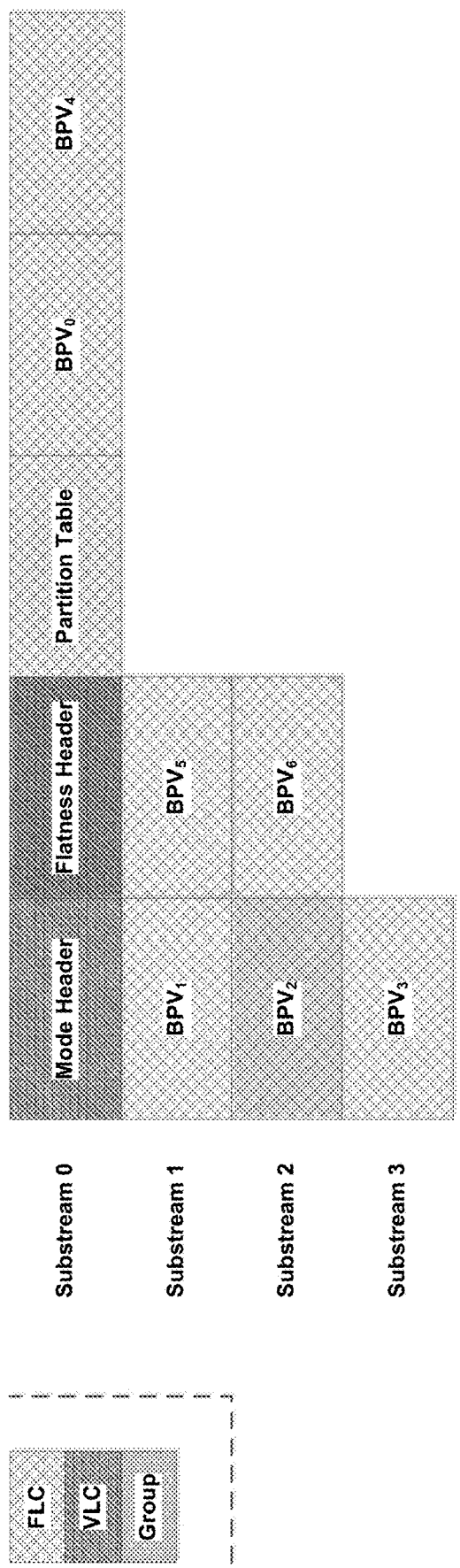
FIG. 16 is a conceptual diagram showing an example substream construction for block prediction skip mode.

BP Skip Mode: BP skip mode is a special case of BP mode, where the residuals are not coded. FIG. 16 shows the substreams for BP skip mode. Substream 0 may contain header information (e.g., mode signaling and flatness signaling), partition information (e.g. a partition table), etc. The block prediction vectors are distributed equally among the four streams, starting from substream 0, 1, 2, and 3 (in order). As an example, when BP vectors are coded for each 1×2 sub-blocks, the 8 BP vectors for block size of 2×8 are put in the substreams as shown in the example of FIG. 16.

Figure 17:
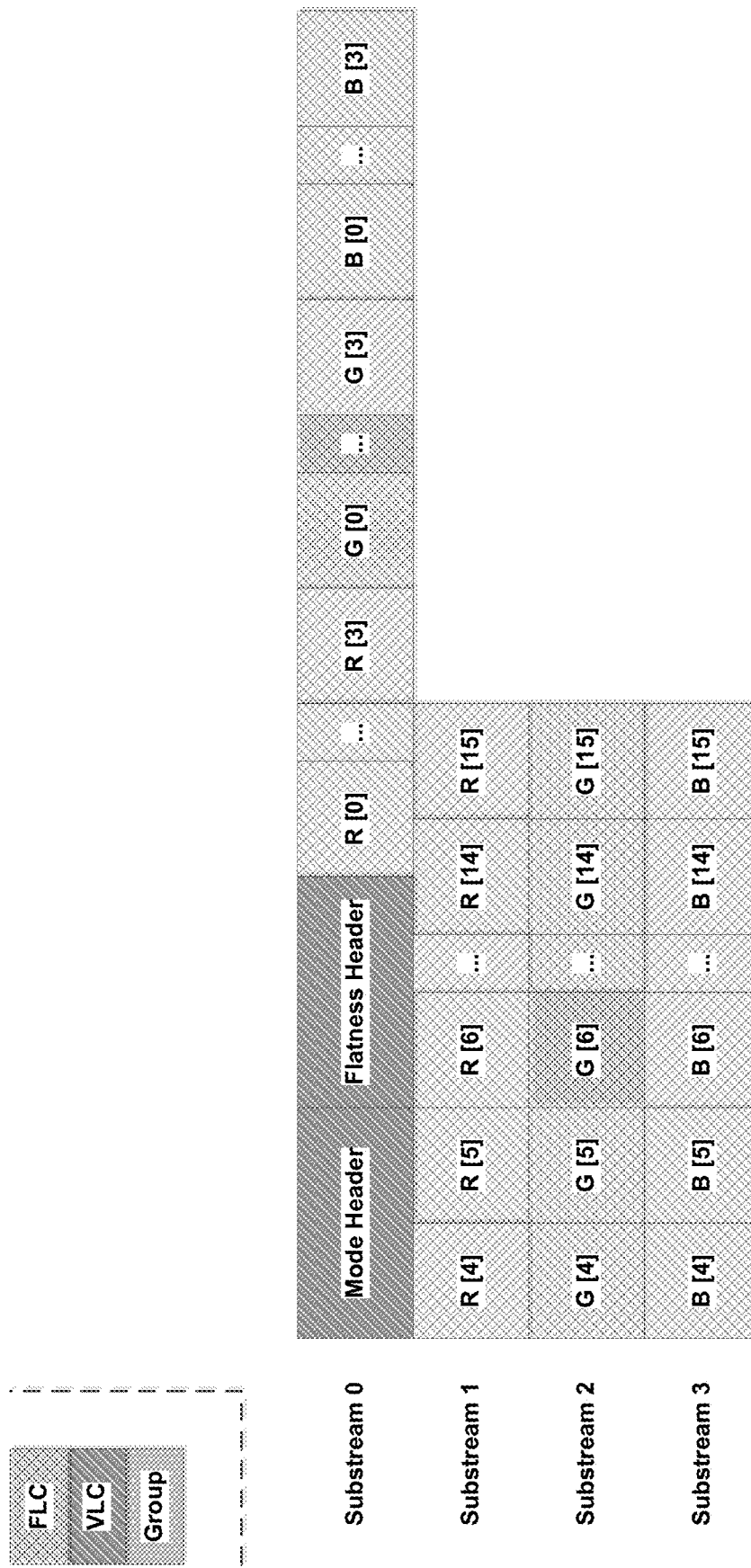
FIG. 17 is a conceptual diagram showing an example substream construction for mid-point predication fall back mode.

MPPF Mode: MPPF mode is a special case of MPP mode, where the residuals in the MPPF are coded using a fixed-size quantizer. Also, in MPPF mode, the prediction is carried out in the input color space without applying any color space transformation. As shown in the example of FIG. 17, the substreams for MPPF may be constructed in a similar way as in MPP mode, except that in MPPF mode there is no bit corresponding to CSC.

Figure 18:
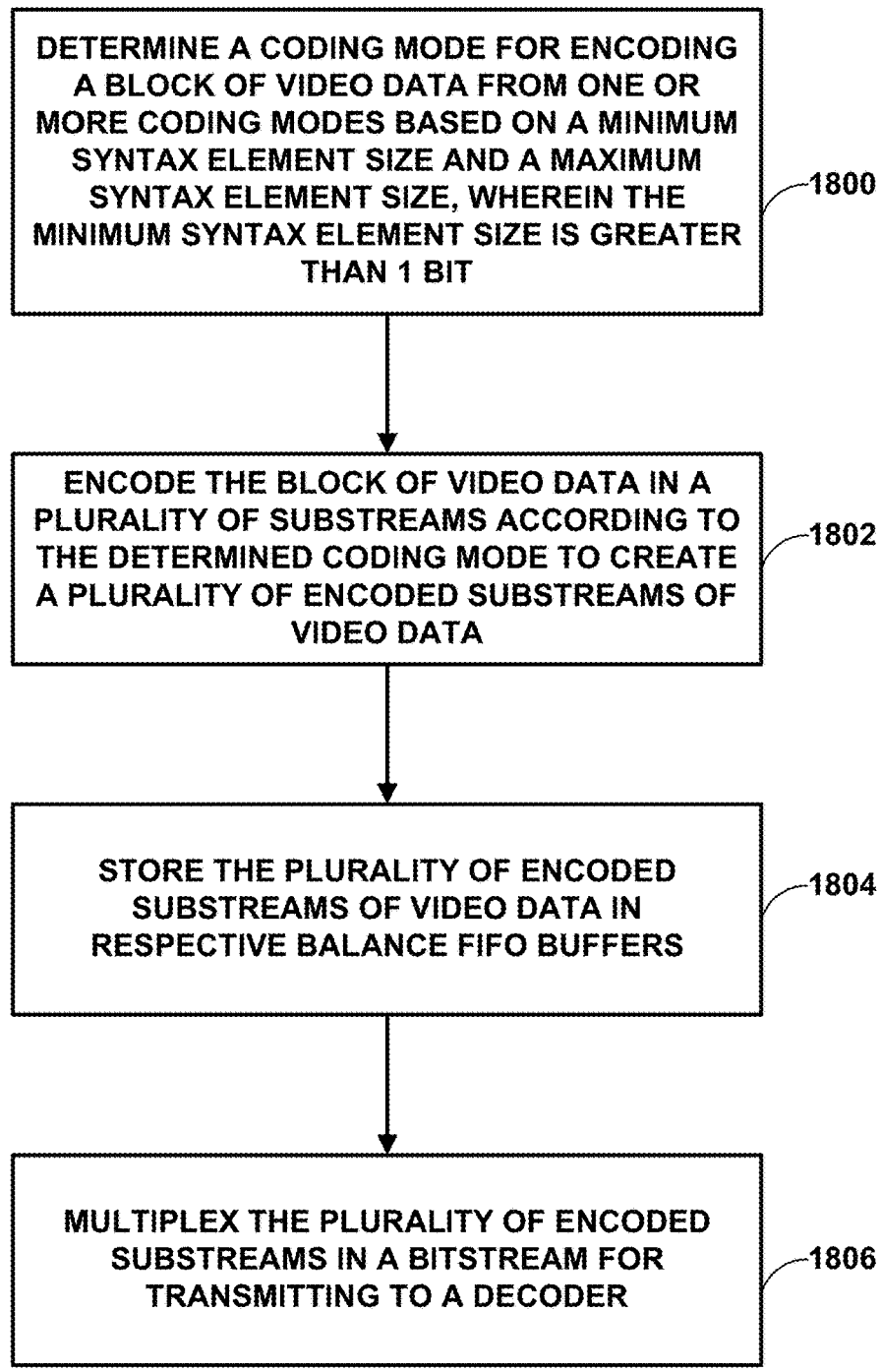
FIG. 18 is a flowchart showing an example method of the disclosure.

FIG. 18 is a flowchart showing an example method of the disclosure. One or more structural components of video encoder 20 may be configured to perform the method of FIG. 18.

In one example of the disclosure, video encoder 20 may be configured to determine a coding mode for encoding the block of video data from among one or more coding modes based on a minimum syntax element size and a maximum syntax element size, wherein the minimum syntax element size is greater than 1 bit (1800). In one example of the disclosure, the minimum syntax element size is 2 bits. Video encoder 20 may be further configured to encode the block of video data in a plurality of substreams according to the determined coding mode to create a plurality of encoded substreams of video data (1802), and store the plurality of encoded substreams of video data in respective balance FIFO buffers (1804). Video encoder 20 may also multiplex the plurality of encoded substreams in a bitstream for transmitting to a decoder (1806).

In another example of the disclosure, to encode the block of video data in the plurality of substream, video encoder 20 may be further configured to encode header information and mode information in a first substream of the plurality of substreams, the header information indicative of at least one of the coding mode or flatness of the block, encode a luminance color component of samples of the block of video data in a second substream of the plurality of substreams, encode a first chrominance component of the samples of the block of video data in a third substream of the plurality of substreams, and encode a second chrominance component of the samples of the block of video data in a fourth substream of the plurality of substreams.

In another example of the disclosure, when the coding mode is a transform mode, video encoder 20 may be further configured to encode a component skip flag for the third substream and the fourth substream using 2 bits in the case that component skip is active. In another example of the disclosure, when the coding mode is one of a block prediction mode or a block prediction skip mode, video encoder 20 may be further configured to encode block prediction vectors in each of the of the plurality of encoded substreams. In another example of the disclosure, when the coding mode is one of a block prediction mode or a block prediction skip mode, video encoder 20 may be further configured to encode block prediction vector tables in each of the plurality of encoded substreams.

In another example of the disclosure, the block of video data is in a 4:2:0 or 4:2:2 chroma sub-sampling format. In this example, video encoder 20 may be further configured to encode header information and mode information in a first substream of the plurality of substreams, the header information indicative of at least one of the coding mode or flatness of the block, encode a first portion of a luminance color component of samples of the block of video data in a second substream of the plurality of substreams, encode a second portion of the luminance color component of samples of the block of video data in a third substream of the plurality of substreams, encode a first chrominance component of the samples of the block of video data in a fourth substream of the plurality of substreams, and encode a second chrominance component of the samples of the block of video data in a fifth substream of the plurality of substreams.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

As used herein, instances of the term "content" may refer to the term "video" or "image" and vice versa. This is true regardless of whether the terms "content" or "video" are being used as an adjective, noun, or other part of speech. For example, reference to a "content coder" may include reference to a "video coder" or an "image coder," and reference to a "video coder" or an "image coder" may include reference to a "content coder." Similarly, reference to "content" also includes reference to "video" or "image," and reference to "video" or "image" may include reference to "content."

As used herein, "content" refers to any type of content. For example, "content" may refer to video content, screen content, image content, any graphical content, or any displayable content. As another example, "content" may refer to pixel data corresponding to video content, screen content, image content, any graphical content, or any displayable content. For example, an image includes a plurality of pixels, with each pixel having one or more components depending on the color space. It is therefore understood that reference to "pixel data" may include reference to pixel data of any content.

As used herein, "pixel data" may refer to one or more pixels. The one or more pixels may include one or more component values. For example, a pixel in the RGB color space may include three color components: a red color component value, a green color component value, and a blue color component value. In some examples, a "sample" may refer to a "pixel." In other examples, a "sample" may refer to a component of a pixel. For example, a pixel in the RGB color space may include three samples: a red sample, a green sample, and a blue sample. The red sample may be the red color component value, the green sample may be the green color component value, and the blue sample may be the blue color component value for the pixel. It is thus understood that reference to performing an operation on a sample may refer to performing an operation on a component (e.g., color component) of a pixel.

As used herein, the term "video" may refer to a plurality of images that may be presented in a sequence. As used herein, the term "image" may refer to a single image (e.g., a picture), one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part (e.g., a sub-block) of a single image, a plurality of sub-parts (e.g., sub-blocks) of a single image, a plurality of sub-parts (e.g., sub-blocks) corresponding to a plurality of images, image data, graphical data, or the like. In some examples, the term "picture" may be interchangeable with "image."

As used herein, the terms "encode" and "compress" may be used interchangeably. Similarly, the terms "decode" and "decompress" may be used interchangeably.

As used herein, the terms "link" or "display link" may refer to a wired or wireless link. In some examples, the terms "link" and "display link" may be interchangeable. In other examples, the terms "link" and "display link" may not be interchangeable. In some examples a display link may refer to a link over which content must comply with a display protocol (which may also be referred to as a display link protocol). Some examples of display protocols include HDMI protocol, DisplayPort protocol, MIPI DSI protocol, or another communication protocol.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to encode video data, the apparatus comprising:
a memory configured to store a first block of video data; and
one or more processors in communication with the memory, the one or more processors configured to:
determine a transform mode coding mode for encoding the first block of video data from among one or more coding modes based on a minimum syntax element size and a maximum syntax element size, wherein the minimum syntax element size is greater than 1 bit;
encode the first block of video data in a first plurality of substreams according to the determined transform mode coding mode to create a first plurality of encoded substreams of video data, wherein to encode the first block of video data in the first plurality of sub stream, the one or more processors are further configured to:
encode header information and mode information for the first block in a first sub stream of the first plurality of sub streams, the header information indicative of at least one of the coding mode or flatness of the block;
encode a luminance color component of samples of the first block of video data in a second sub stream of the first plurality of sub streams;
encode a first component skip flag using 2 bits for a first chrominance component of the samples of the first block of video data in a third substream of the first plurality of sub streams in the case that component skip is active for the first chrominance component; and
encode a second component skip flag using 2 bits for a second chrominance component of the samples of the first block of video data in a fourth substream of the first plurality of substreams in the case that component skip is active for the second chrominance component;
store the first plurality of encoded substreams of video data in respective balance FIFO buffers; and
multiplex the first plurality of encoded substreams in a bitstream for transmitting to a decoder.

2. The apparatus of claim 1, wherein the minimum syntax element size is 2 bits.

3. The apparatus of claim 1, wherein the one or more processors are further configured to:
determine a coding mode for encoding a second block of video data from among one or more coding modes based on a minimum syntax element size and a maximum syntax element size, wherein the minimum syntax element size is greater than 1 bit, wherein the coding mode is one of a block prediction mode or a block prediction skip mode; and
encode block prediction vectors for the second block of video data in each of a second plurality of encoded sub streams.

4. The apparatus of claim 1, wherein the one or more processors are further configured to:
determine a coding mode for encoding a second block of video data from among one or more coding modes based on a minimum syntax element size and a maximum syntax element size, wherein the minimum syntax element size is greater than 1 bit, wherein the coding mode is one of a block prediction mode or a block prediction skip mode; and
encode block prediction vector tables for the second block of video data in each of a second plurality of encoded sub streams.

5. The apparatus of claim 1, wherein the one or more processors are further configured to:
determine a coding mode for encoding a second block of video data from among one or more coding modes based on a minimum syntax element size and a maximum syntax element size, wherein the minimum syntax element size is greater than 1 bit, wherein the second block of video data is in a 4:2:0 or 4:2:2 chroma sub-sampling format; and
encode header information and mode information for the second block in a first sub stream of a second plurality of substreams, the header information indicative of at least one of the coding mode or flatness of the block;
encode a first portion of a luminance color component of samples of the second block of video data in a second sub stream of the second plurality of sub streams;
encode a second portion of the luminance color component of samples of the second block of video data in a third substream of the second plurality of sub streams;
encode a first chrominance component of the samples of the second block of video data in a fourth substream of the second plurality of substreams; and
encode a second chrominance component of the samples of the second block of video data in a fifth substream of the second plurality of substreams.

6. The apparatus of claim 1, wherein each of the first plurality of sub streams has an associated maximum syntax element size, and wherein each of the associated maximum syntax element sizes may be different.

7. A method of encoding video data, the method comprising:
determining a transform mode coding mode for encoding a first block of video data from among one or more coding modes based on a minimum syntax element size and a maximum syntax element size, wherein the minimum syntax element size is greater than 1 bit;
encoding the first block of video data in a first plurality of substreams according to the determined transform mode coding mode to create a first plurality of encoded sub streams of video data, wherein encoding the first block of video data in the first plurality of sub stream comprises:
encoding header information and mode information for the first block in a first substream of the first plurality of substreams, the header information indicative of at least one of the coding mode or flatness of the block;
encoding a luminance color component of samples of the first block of video data in a second substream of the first plurality of substreams;
encoding a first component skip flag using 2 bits for a first chrominance component of the samples of the first block of video data in a third substream of the first plurality of sub streams in the case that component skip is active for the first chrominance component; and
encoding a second component skip flag using 2 bits for a second chrominance component of the samples of the first block of video data in a fourth substream of the first plurality of sub streams in the case that component skip is active for the second chrominance component;
storing the first plurality of encoded sub streams of video data in respective balance FIFO buffers; and
multiplexing the first plurality of encoded sub streams in a bitstream for transmitting to a decoder.

8. The method of claim 7, wherein the minimum syntax element size is 2 bits.

9. The method of claim 7, further comprising:
determining a coding mode for encoding a second block of video data from among one or more coding modes based on a minimum syntax element size and a maximum syntax element size, wherein the minimum syntax element size is greater than 1 bit, wherein the coding mode is one of a block prediction mode or a block prediction skip mode, and wherein encoding the second block of video data comprises encoding block prediction vectors for the second block of video data in each of the of a second plurality of encoded substreams.

10. The method of claim 7, further comprising:
determining a coding mode for encoding a second block of video data from among one or more coding modes based on a minimum syntax element size and a maximum syntax element size, wherein the minimum syntax element size is greater than 1 bit, wherein the coding mode is one of a block prediction mode or a block prediction skip mode, and wherein encoding the second block of video data comprises encoding block prediction vector tables for the second block of video data in each of a second plurality of encoded substreams.

11. The method of claim 7, further comprising:
determining a coding mode for encoding a second block of video data from among one or more coding modes based on a minimum syntax element size and a maximum syntax element size, wherein the minimum syntax element size is greater than 1 bit, wherein the second block of video data is in a 4:2:0 or 4:2:2 chroma sub-sampling format, and wherein encoding the second block of video data in the second plurality of substreams comprises:
encoding header information and mode information for the second block in a first sub stream of a second plurality of substreams, the header information indicative of at least one of the coding mode or flatness of the block;
encoding a first portion of a luminance color component of samples of the second block of video data in a second substream of the second plurality of substreams;
encoding a second portion of the luminance color component of samples of the second block of video data in a third substream of the second plurality of substreams;
encoding a first chrominance component of the samples of the second block of video data in a fourth substream of the second plurality of substreams; and
encoding a second chrominance component of the samples of the second block of video data in a fifth substream of the second plurality of substreams.

12. The method of claim 7, wherein each of the first plurality of substreams has an associated maximum syntax element size, and wherein each of the associated maximum syntax element sizes may be different.

13. A non-transitory computer-readable storage medium storing instructions that, when executed, causes one or more processors configured to encode video data to:
determine a transform mode coding mode for encoding a first block of video data from among one or more coding modes based on a minimum syntax element size and a maximum syntax element size, wherein the minimum syntax element size is greater than 1 bit;
encode the first block of video data in a first plurality of substreams according to the determined transform mode coding mode to create a plurality of encoded sub streams of video data, wherein to encode the first block of video data in the first plurality of substream, the instructions further cause the one or more processors to:
encode header information and mode information for the first block in a first sub stream of the first plurality of sub streams, the header information indicative of at least one of the coding mode or flatness of the block;
encode a luminance color component of samples of the first block of video data in a second sub stream of the first plurality of sub streams;
encode a first component skip flag using 2 bits for a first chrominance component of the samples of the first block of video data in a third substream of the first plurality of sub streams in the case that component skip is active for the first chrominance component; and
encode a second component skip flag using 2 bits for a second chrominance component of the samples of the first block of video data in a fourth substream of the first plurality of substreams in the case that component skip is active for the second chrominance component;
store the plurality of encoded substreams of video data in respective balance FIFO buffers; and
multiplex the plurality of encoded sub streams in a bitstream for transmitting to a decoder.

14. The non-transitory computer-readable storage medium of claim 13, wherein the minimum syntax element size is 2 bits.

15. The non-transitory computer-readable storage medium of claim 13, wherein the instructions further cause the one or more processors to:
determine a coding mode for encoding a second block of video data from among one or more coding modes based on a minimum syntax element size and a maximum syntax element size, wherein the minimum syntax element size is greater than 1 bit, wherein the coding mode is one of a block prediction mode or a block prediction skip mode; and encode block prediction vectors for the second block of video data in each of a second plurality of encoded sub streams.

16. The non-transitory computer-readable storage medium of claim 13, wherein the instructions further cause the one or more processors to:

determine a coding mode for encoding a second block of video data from among one or more coding modes based on a minimum syntax element size and a maximum syntax element size, wherein the minimum syntax element size is greater than 1 bit, wherein the second block of video data is in a 4:2:0 or 4:2:2 chroma sub-sampling format; and encode header information and mode information for the second block in a first sub stream of a second plurality of substreams, the header information indicative of at least one of the coding mode or flatness of the block;

encode a first portion of a luminance color component of samples of the second block of video data in a second sub stream of the second plurality of sub streams;

encode a second portion of the luminance color component of samples of the second block of video data in a third substream of the second plurality of sub streams;

encode a first chrominance component of the samples of the second block of video data in a fourth substream of the second plurality of substreams; and encode a second chrominance component of the samples of the second block of video data in a fifth substream of the second plurality of substreams.

17. An apparatus configured to encode video data, the apparatus comprising:

means for determining a transform mode coding mode for encoding a first block of video data from among one or more coding modes based on a minimum syntax element size and a maximum syntax element size, wherein the minimum syntax element size is greater than 1 bit;

means for encoding the first block of video data in a first plurality of substreams according to the determined transform mode coding mode to create a first plurality of encoded substreams of video data, wherein the means for encoding the first block of video data in the first plurality of substream comprises:

means for encoding header information and mode information for the first block in a first substream of the first plurality of substreams, the header information indicative of at least one of the coding mode or flatness of the block;

means for encoding a luminance color component of samples of the first block of video data in a second substream of the first plurality of substreams;

means for encoding a first component skip flag using 2 bits for a first chrominance component of the samples of the first block of video data in a third substream of the first plurality of substreams in the case that component skip is active for the first chrominance component; and means for encoding a second component skip flag using 2 bits for a second chrominance component of the samples of the first block of video data in a fourth substream of the first plurality of substreams in the case that component skip is active for the second chrominance component;

means for storing the first plurality of encoded substreams of video data in respective balance FIFO buffers; and means for multiplexing the first plurality of encoded substreams in a bitstream for transmitting to a decoder.

18. The apparatus of claim 17, wherein the minimum syntax element size is 2 bits.

19. The apparatus of claim 17, further comprising:

means for determining a coding mode for encoding a second block of video data from among one or more coding modes based on a minimum syntax element size and a maximum syntax element size, wherein the minimum syntax element size is greater than 1 bit, wherein the coding mode is one of a block prediction mode or a block prediction skip mode, and wherein the means for encoding the block of video data comprises means for encoding block prediction vectors for the second block of video data in each of the of a second plurality of encoded sub streams.

20. The apparatus of claim 17, further comprising:

determining a coding mode for encoding a second block of video data from among one or more coding modes based on a minimum syntax element size and a maximum syntax element size, wherein the minimum syntax element size is greater than 1 bit, wherein the coding mode is one of a block prediction mode or a block prediction skip mode, and wherein the means for encoding the block of video data comprises means for encoding block prediction vector tables for the second block of video data in each of a second plurality of encoded substreams.

21. The apparatus of claim 17, further comprising:

determining a coding mode for encoding a second block of video data from among one or more coding modes based on a minimum syntax element size and a maximum syntax element size, wherein the minimum syntax element size is greater than 1 bit, wherein the second block of video data is in a 4:2:0 or 4:2:2 chroma sub-sampling format, and wherein the means for encoding the second block of video data in the plurality of sub streams comprises:

means for encoding header information and mode information for the second block in a first substream of a second plurality of substreams, the header information indicative of at least one of the coding mode or flatness of the block;

means for encoding a first portion of a luminance color component of samples of the second block of video data in a second substream of the second plurality of substreams;

means for encoding a second portion of the luminance color component of samples of the second block of video data in a third substream of the second plurality of substreams;

means for encoding a first chrominance component of the samples of the second block of video data in a fourth substream of the second plurality of substreams; and means for encoding a second chrominance component of the samples of the second block of video data in a fifth substream of the second plurality of substreams.

22. The apparatus of claim 17, wherein each of the plurality of substreams has an associated maximum syntax element size, and wherein each of the associated maximum syntax element sizes may be different.

* * * * *